(12) United States Patent
Kuratani et al.

(10) Patent No.: US 11,002,954 B2
(45) Date of Patent: May 11, 2021

(54) CLEANING DEVICE, AND IMAGE CAPTURING APPARATUS INCLUDING CLEANING DEVICE

(71) Applicant: Murata Manufacturing Co., Ltd., Nagaokakyo (JP)

(72) Inventors: Yasuhiro Kuratani, Nagaokakyo (JP); Katsumi Fujimoto, Nagaokakyo (JP); Kenji Nishiyama, Nagaokakyo (JP); Chikahiro Horiguchi, Nagaokakyo (JP); Shinichiro Ichiguchi, Nagaokakyo (JP); Masaaki Takata, Nagaokakyo (JP); Yuzo Mizushima, Nagaokakyo (JP); Yuuki Ishii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/663,448

(22) Filed: Oct. 25, 2019

(65) Prior Publication Data
US 2020/0057301 A1    Feb. 20, 2020

Related U.S. Application Data

(63) Continuation of application No. PCT/JP2018/003383, filed on Feb. 1, 2018.

(30) Foreign Application Priority Data

Apr. 26, 2017    (JP) .............................. JP2017-087230

(51) Int. Cl.
*G02B 27/00*    (2006.01)
*B08B 7/02*    (2006.01)
(Continued)

(52) U.S. Cl.
CPC ............ *G02B 27/0006* (2013.01); *B08B 7/02* (2013.01); *B60R 11/04* (2013.01); *B60S 2011/004* (2013.01); *B60S 1/56* (2013.01)

(58) Field of Classification Search
CPC ........ B60S 1/56; B60S 1/481; G02B 27/0006; B08B 7/02; B60R 11/04; B60R 2011/004
(Continued)

(56) References Cited

U.S. PATENT DOCUMENTS 3,663,841 A * 5/1972 Parker .................. B06B 1/0655
310/322
2004/0047625 A1   3/2004 Ito et al.
(Continued)

FOREIGN PATENT DOCUMENTS

DE    4435941    * 4/1995  ............. B60S 1/603
EP    3548194 A1  10/2019
(Continued)

OTHER PUBLICATIONS

Official Communication issued in International Patent Application No. PCT/JP2018/003383, dated May 1, 2018.
(Continued)

*Primary Examiner* — George G King
(74) *Attorney, Agent, or Firm* — Keating & Bennett, LLP

(57) ABSTRACT

A cleaning device includes a casing holding an image capturing device, a protective cover disposed in a visual field of the image capturing device, a vibrator to vibrate the protective cover, a controller to control the vibrator, a monitor to detect an electrical characteristic value associated with a vibration of the vibrator, and a storage to store determination criteria based on which the controller evaluates the electrical characteristic value detected by the monitor. The controller is configured to evaluate the electrical characteristic value based on the plurality of determination
(Continued)

criteria stored in the storage and clean a surface of the translucent body by controlling the vibrator according to the determination.

15 Claims, 8 Drawing Sheets

(51) Int. Cl.
*B60R 11/04* (2006.01)
*B60R 11/00* (2006.01)
*B60S 1/56* (2006.01)

(58) Field of Classification Search
USPC ............... 134/50, 56 R; 222/75; 239/284.1
See application file for complete search history.

(56) References Cited

U.S. PATENT DOCUMENTS

| | | | |
|---|---|---|---|
| 2011/0073142 A1 | 3/2011 | Hattori et al. | |
| 2013/0276627 A1 | 10/2013 | Luo | |
| 2013/0343907 A1* | 12/2013 | Phillips | F04B 17/03 417/12 |
| 2015/0040953 A1 | 2/2015 | Kikuta et al. | |
| 2016/0266379 A1 | 9/2016 | Li et al. | |
| 2018/0246323 A1* | 8/2018 | Fedigan | B60S 1/56 |

FOREIGN PATENT DOCUMENTS

| | | | | |
|---|---|---|---|---|
| FR | 2841488 | * | 1/2004 | ............... B60S 1/56 |
| JP | 57-175342 | A | 10/1982 | |
| JP | 2004-056368 | A | 2/2004 | |
| JP | 2006-217536 | A | 8/2006 | |
| JP | 2006-295844 | A | 10/2006 | |
| JP | 2009-189496 | A | 8/2009 | |
| JP | 2009-264135 | A | 11/2009 | |
| JP | 2011-240910 | A | 12/2011 | |
| JP | 2015-057338 | A | 3/2015 | |
| JP | 2015-231173 | A | 12/2015 | |

OTHER PUBLICATIONS

Kuratani et al., "Cleaning Device, and Image Capturing Apparatus Including Cleaning Device", U.S. Appl. No. 17/143,250, filed Jan. 7, 2021.

Official Communication issued in corresponding European Patent Application No. 18791776.0, dated Dec. 4, 2020.

* cited by examiner

CLEANING DEVICE, AND IMAGE CAPTURING APPARATUS INCLUDING CLEANING DEVICE

CROSS REFERENCE TO RELATED APPLICATIONS

This application claims the benefit of priority to Japanese Patent Application No. 2017-087230 filed on Apr. 26, 2017 and is a Continuation Application of PCT Application No. PCT/JP2018/003383 filed on Feb. 1, 2018. The entire contents of each application are hereby incorporated herein by reference.

BACKGROUND OF THE INVENTION

1. Field of the Invention

The present invention relates to a cleaning device, and an image capturing apparatus including a cleaning device.

2. Description of the Related Art

An image capturing apparatus has been provided at the front or rear of a vehicle and images captured by the image capturing apparatus are used as images or the like for navigation. Such an image capturing apparatus is provided outside a vehicle, so foreign matter, such as raindrops, mud, and dust, can adhere to a translucent body (lens or protective glass) that covers the outer portion of the image capturing apparatus. When foreign matter is adhered to the front surface of the image capturing apparatus, the image of the adhered foreign matter is included in an image captured by the image capturing apparatus, and a clear image is not obtained. For this reason, an image capturing apparatus equipped with a cleaning device that discharges cleaning solution to the surface of a translucent body has been developed. Specifically, Japanese Unexamined Patent Application Publication No. 2015-057338 describes an image capturing apparatus equipped with a cleaning device.

However, the cleaning device described in Japanese Unexamined Patent Application Publication No. 2015-057338 only has the function of cleaning a translucent body by discharging cleaning solution from an opening portion of a nozzle to the surface of the translucent body, and performs the same cleaning process regardless of the amount and condition of adherents (dirt) on the translucent body. Therefore, with the cleaning device described in Japanese Unexamined Patent Application Publication No. 2015-057338, when the cleaning process is set for a state where the amount and condition of adherents on the translucent body is severe, there is an inconvenience that the cleaning process is excessively performed even in a state where the amount and condition of adherents on the translucent body is light, with the result of unnecessary discharge of cleaning solution or unnecessary consumption of electric power. In addition, with the cleaning device described in Japanese Unexamined Patent Application Publication No. 2015-057338, when the cleaning process is set for a state where the amount and condition of adherents on the translucent body is light, there is an inconvenience that the translucent body is not sufficiently cleaned when the amount and condition of adherents on the translucent body is severe.

SUMMARY OF THE INVENTION

Preferred embodiments of the present invention provide cleaning devices that are each able to control the level of cleaning according to the amount and condition of adherents on a translucent body and image capturing apparatuses including the cleaning devices.

A cleaning device according to a preferred embodiment of the present invention includes a holder holding an imaging element, a translucent body disposed in a visual field of the imaging element, a vibrator configured to vibrate the translucent body, a controller configured to control the vibrator, a monitor configured to detect an electrical characteristic value associated with a vibration of the vibrator, and a storage configured to store determination criteria based on which the controller evaluates the electrical characteristic value detected by the monitor. The controller is configured to evaluate the electrical characteristic value based on a plurality of the determination criteria stored in the storage and clean a surface of the translucent body by controlling the vibrator according to the determination.

An image capturing apparatus according to a preferred embodiment of the present invention includes a cleaning device according to a preferred embodiment of the present invention.

According to preferred embodiments of the present invention, the controller evaluates an electrical characteristic value detected by the monitor based on the plurality of determination criteria and changes the level of cleaning according to the determination. Thus, excessive cleaning or insufficient cleaning is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
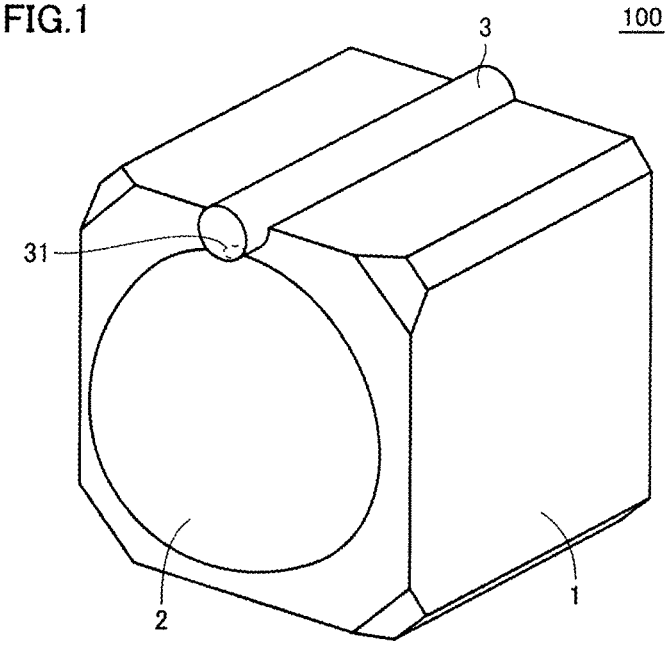
FIG. 1 is a perspective view showing the configuration of an image capturing apparatus according to a first preferred embodiment of the present invention.

Hereinafter, image capturing apparatuses according to preferred embodiments of the present invention will be described in detail with reference to the drawings. In the drawings, like reference numerals denote the same or corresponding portions.

First Preferred Embodiment

Figure 2:
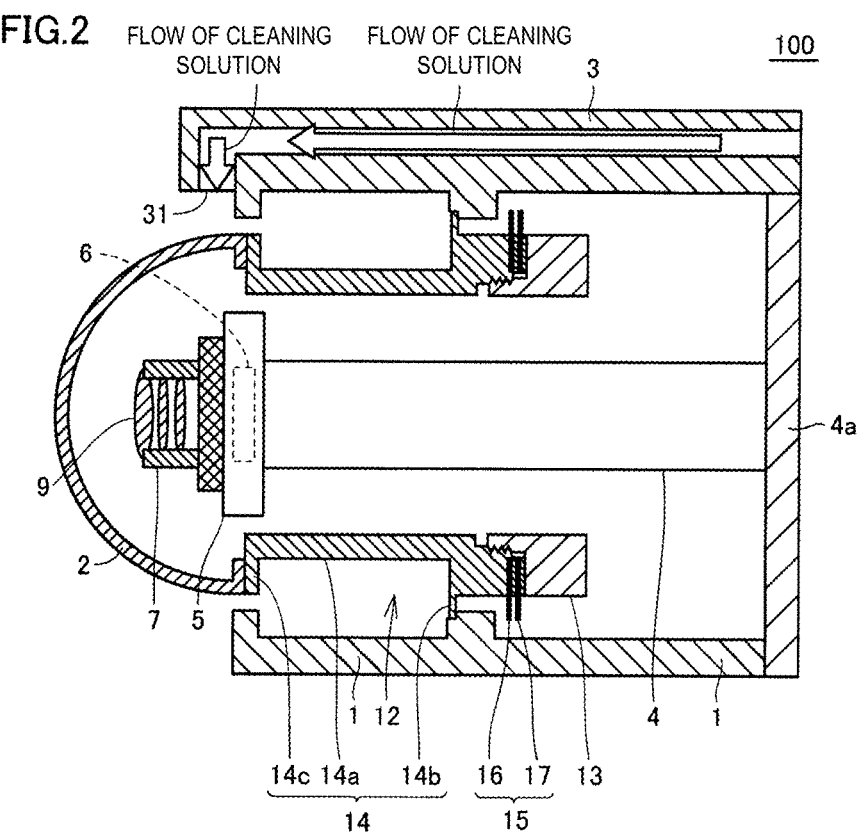
FIG. 2 is a cross-sectional view showing the configuration of the image capturing apparatus according to the first preferred embodiment of the present invention.

An image capturing apparatus according to a first preferred embodiment of the present invention will be described with reference to the drawings. FIG. 1 is a perspective view showing the configuration of the image capturing apparatus 100 according to the first preferred embodiment of the present invention. FIG. 2 is a cross-sectional view showing the configuration of the image capturing apparatus 100 according to the first preferred embodiment of the present invention. The image capturing apparatus 100 includes a casing 1, a translucent protective cover 2 provided at one side of the casing 1, a cleaning nozzle 3 including an opening portion 31 to discharge cleaning solution to the protective cover 2, a vibrator 12 that causes the protective cover 2 to vibrate, and an image capturing device 5 provided inside the protective cover 2. The components, that is, the casing 1, the protective cover 2, the cleaning nozzle 3, and the vibrator 12 of the image capturing apparatus 100, other than the image capturing device 5, define a cleaning device that cleans foreign matter (adherents) adhered to an image capturing range of the image capturing device 5.

As shown in FIG. 2, the image capturing device 5 is supported by a cylindrical body 4 and is fixed to a base plate 4a. The base plate 4a is fixed to a portion of the casing 1. Therefore, the casing 1 defines and functions as a holder that holds the image capturing device 5 via the body member 4 and the base plate 4a. The holder is not limited to the structure shown in FIG. 2 as long as the holder can hold the image capturing device 5.

A circuit 6 including an imaging element is incorporated in the image capturing device 5. A lens module 7 is fixed in an image capture direction of the image capturing device 5. The lens module 7 preferably has a cylindrical or substantially cylindrical body. A plurality of lenses 9 are provided inside the lens module 7. The structure of the image capturing device 5 is not specifically limited as long as the image capturing device 5 can capture an object to be captured, located in front of the lenses 9.

The casing 1 preferably has a square or substantially square cylindrical shape and is preferably made of, for example, a metal or a synthetic resin. The casing 1 may have another shape, such as a circular or substantially circular cylindrical shape. The base plate 4a is fixed to one end of the casing 1, and the protective cover 2 and the vibrator 12 are provided on the other end of the casing 1.

The vibrator 12 preferably has a circular cylindrical shape. The vibrator 12 includes a circular cylindrical first cylindrical member 13, a circular cylindrical second cylindrical member 14, and a circular cylindrical piezoelectric resonator 15. The circular cylindrical piezoelectric resonator 15 includes two circular cylindrical piezoelectric plates 16, 17. In the two piezoelectric plates 16, 17, a polarization direction of one of the piezoelectric plates is opposite to a polarization direction of the other one of the piezoelectric plates in a thickness direction.

In the present preferred embodiment, a vibrator or a piezoelectric resonator may have a square cylindrical shape other than a circular cylindrical shape. Preferably, a circular cylindrical shape, that is, a ring shape, is used.

The piezoelectric plates 16, 17 are preferably made of lead zirconate titanate (PZT)-based piezoelectric ceramics, for example. Other piezoelectric ceramics, such as $(K, Na)NbO_3$, may also be used. In addition, a piezoelectric monocrystal, such as $LiTaO_3$, may also be used.

An electrode (not shown) is provided on each of the surfaces of the piezoelectric plates 16, 17. The electrodes preferably have, for example, an Ag/NiCu/NiCr multilayer structure.

The first cylindrical member 13 is fixed to the bottom surface of the piezoelectric resonator 15. The first cylindrical member 13 is preferably made of a metal. Examples of the metal include duralumin, stainless steel, and kovar. The first cylindrical member 13 may be made from a semiconductor, such as Si, having electrical conductivity.

The piezoelectric resonator 15 is sandwiched between a portion of the first cylindrical member 13 and a portion of the second cylindrical member 14. The first cylindrical member 13 and the second cylindrical member 14 are each preferably made of a metal and have electrical conductivity. When an alternating current electric field is applied to the electrode of each of the piezoelectric plates 16, 17, the piezoelectric resonator 15 can be longitudinally vibrated or horizontally vibrated. At a portion of the second cylindrical member 14, an internal threaded portion is provided on the inner periphery. Thus, the first cylindrical member 13 is screwed into the second cylindrical member 14, and the first cylindrical member 13 is fixed to the second cylindrical member 14. As a result of the screwing, a portion of the first cylindrical member 13 and a portion of the second cylindrical member 14 are in press-contact with the top surface and bottom surface of the piezoelectric resonator 15.

Therefore, with vibrations generated in the piezoelectric resonator 15, the entire vibrator 12 efficiently vibrates. In the present preferred embodiment, the vibrator 12 is efficiently excited by longitudinal effect or transversal effect.

A flange portion 14b extending outward is provided in the second cylindrical member 14. The flange portion 14b is disposed in a recess of the casing 1 and is fixed.

A flange portion 14c extending outward is provided at an edge of the second cylindrical member 14. A portion connecting the flange portion 14b and the flange portion 14c is a thin wall portion 14a. The thickness of the thin wall portion 14a is thinner than the thickness of the first cylindrical member 13. Therefore, the cylindrical thin wall portion 14a is displaced by a large amount by the vibrations of the vibrator 12. With the thin wall portion 14a, vibrations, particularly, amplitude width, can be increased.

The protective cover 2 is fixed to the flange portion 14c. The protective cover 2 defines and functions as a translucent body that allows light from an object to be captured to penetrate. The protective cover 2 includes an opening that is open in one direction. The edge of the opening is joined with the flange portion 14c. This joining is preferably performed by using, for example, adhesive or brazing material. Thermal compression bonding, anodic bonding, or the like, may also be used.

The protective cover 2 has a dome shape so as to extend from the edge joined with the flange portion 14c. In the present preferred embodiment, the dome shape is preferably a hemispherical shape. The image capturing device 5 preferably has, for example, a view angle of about 170°. The dome shape is not limited to the hemispherical shape. The protective cover 2 may have a shape in which a circular cylinder is connected to a hemisphere, a curved surface shape smaller than a hemisphere, or another shape. The entire protective cover 2 has translucency. In the present preferred embodiment, the protective cover 2 is preferably made of glass, for example. The protective cover 2 is not limited to glass and may be made of translucent plastics, or the like. Alternatively, the protective cover 2 may be made of translucent ceramics. Depending on application, tempered glass is preferably used. Thus, the strength is improved. Furthermore, in the case of glass, a coating layer made of DLC, for example, may be provided on the surface to increase the strength.

The lens module 7 and image capturing device 5 are disposed inside the protective cover 2. An external object to be captured is captured through the protective cover 2.

A cleaning nozzle 3 is provided on the casing 1. The cleaning nozzle 3 includes an opening portion 31 to discharge cleaning solution to the protective cover 2. The cleaning nozzle 3 preferably has a cylindrical shape and is supplied with cleaning solution from an end portion opposite from an end portion including the opening portion 31. The cleaning nozzle 3 discharges cleaning solution from the opening portion 31 to the edge of the protective cover 2. The distal end of the cleaning nozzle 3 is located outside the image capturing range (visual field) of the image capturing device 5. The opening portion 31 is not located at a position where the image is captured by the image capturing device 5. In FIG. 2, flow of cleaning solution is represented by the arrows. The cleaning nozzle 3 defines and functions as a discharge portion that discharges cleaning solution. In the present preferred embodiment, the configuration in which the single cleaning nozzle 3 is provided on the casing 1 is shown. Alternatively, a plurality of the cleaning nozzles 3 may be provided on the casing 1.

The present preferred embodiment describes the following structure. The cleaning device provided in the image capturing apparatus 100 (hereinafter, simply referred to as cleaning device) includes the cleaning nozzle 3. The protective cover 2 can be cleaned by discharging cleaning solution to the protective cover 2. Alternatively, the following configuration may be provided. No cleaning nozzle 3 is provided, and the protective cover 2 is cleaned by just vibrating the protective cover 2. Of course, the cleaning device may include another component (for example, an air blower, or the like) in addition to the cleaning nozzle 3 or instead of the cleaning nozzle 3.

Figure 3:
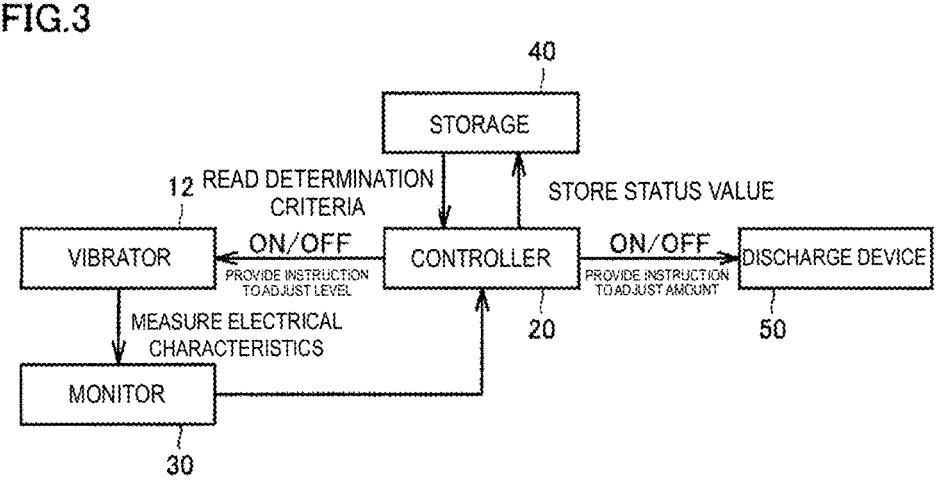
FIG. 3 is a block diagram for illustrating control of a cleaning device of the image capturing apparatus according to the first preferred embodiment of the present invention.

Next, control of the cleaning device will be described with reference to the drawings. FIG. 3 is a block diagram for illustrating control of the cleaning device of the image capturing apparatus 100 according to the first preferred embodiment of the present invention.

The cleaning device includes a controller 20 that controls the vibrator 12 and the discharge device 50, a monitor 30 that detects an electrical characteristic value (resonant frequency fr) of the vibrator 12, and a storage 40 connected to the controller 20. As for the discharge device 50, the configuration of discharging the cleaning solution from the opening portion 31 of the cleaning nozzle 3 is shown as one block.

The vibrator 12, in an initial state where no foreign matter is adhered to the protective cover 2, causes the protective cover 2 to vibrate at a resonant frequency by receiving a set amplitude width value V0 (for example, about 3 V) and a rectangular wave signal of frequency f0 from the controller 20. The vibrator 12 includes a self-excited circuit that controls vibrations and is able to vibrate the protective cover 2 at a resonant frequency fr of a frequency f0. The resonant frequency fr varies depending on, for example, the status of the protective cover 2, environmental temperature, or the like.

The monitor 30 detects the electrical characteristic value (resonant frequency fr) at set intervals from the vibrator 12 vibrating at a resonant frequency. The resonant frequency fr being monitored changes according to the amount and condition of adherents on the protective cover 2. Generally, when foreign matter adheres to the protective cover 2, the resonant frequency fr being monitored decreases. Particularly, as the amount of foreign matter adhered to the protective cover 2 increases, the resonant frequency fr being monitored decreases. Even when the same amount of foreign matter adheres to the protective cover 2, as the mass of foreign matter increases, the resonant frequency fr being monitored decreases.

The controller 20 includes a CPU (central processing unit) as a control center, a ROM (read only memory) storing programs for the CPU to operate, control data, and the like, a RAM (random access memory) that defines and functions as a work area for the CPU, an input/output interface to maintain consistency of signals with peripheral devices, and other devices. The controller 20 determines the resonant frequency fr being monitored by the monitor 30 based on a plurality of determination criteria stored in the storage 40 and acquires the amount and condition of adherents on the protective cover 2 (the status of the protective cover 2). In addition, the controller 20 cleans the protective cover 2 by controlling an instruction to adjust the level of cleaning mode to the vibrator 12 according to the determined amount and condition of adherents on the protective cover 2. The controller 20 cleans the protective cover 2 by controlling the on/off state of discharge of cleaning solution to the discharge device 50 or controlling an instruction to adjust the amount of cleaning solution according to the determined amount and condition of adherents on the protective cover 2.

The storage 40 is a nonvolatile memory (for example, flash memory, or the like) connected to the controller 20 and stores the determination criteria that are used by the controller 20. The storage 40 can store a status value such as the amount and condition of adherents on the protective cover 2, determined by the controller 20. The storage 40 does not need to be physically isolated from the controller 20 and may be integrated as one chip with the CPU that is a component of the controller 20.

The storage 40 stores the plurality determination criteria. The plurality of determination criteria stored may be determination criteria of the same type or determination criteria of different types. Specifically, the determination criteria of the same type are, for example, a first threshold with which the electrical characteristic value detected by the monitor 30 is compared, and a second threshold different from the first threshold. The determination criteria of different types are, for example, a threshold with which the electrical characteristic value detected by the monitor 30 is compared, and a duration of control. The number of determination criteria is not limited to two as described above and may be three or more. When three or more determination criteria are set, the amount and condition of adherents on the protective cover 2 can be further minutely acquired by evaluating the electrical characteristic value detected by the monitor 30 based on each of the determination criteria. Furthermore, when the cleaning device is configured to be able to, for example, control the level of vibrations of the vibrator in multiple stages according to the determination, the protective cover 2 can be further efficiently cleaned.

Figure 4:
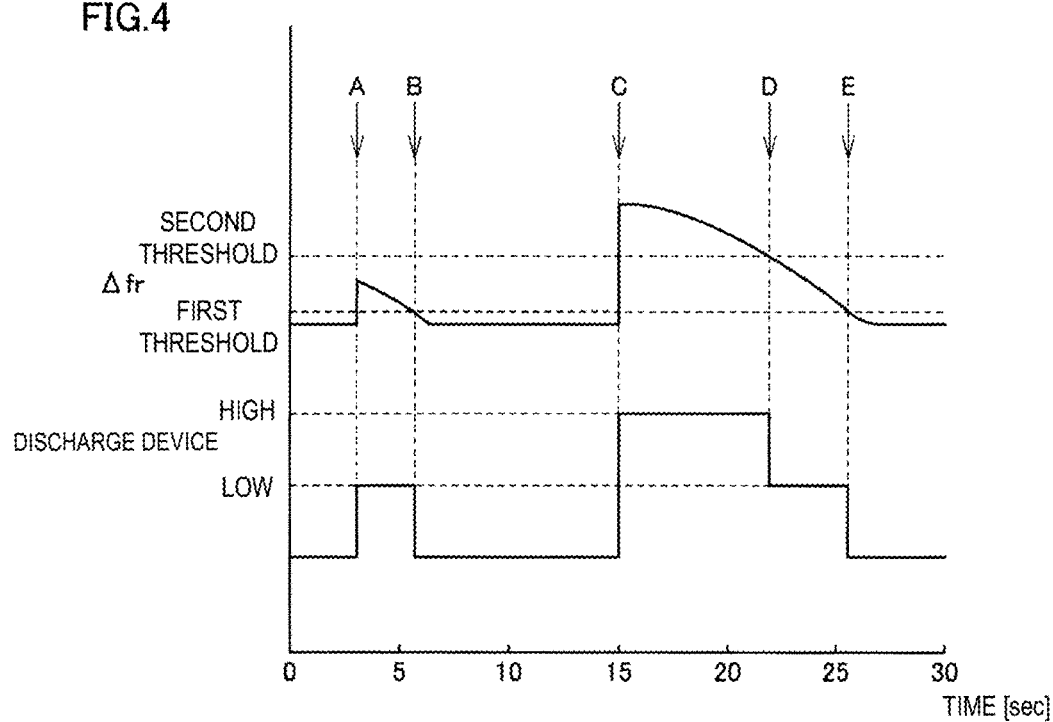
FIG. 4 is a timing chart for illustrating control of the cleaning device of the image capturing apparatus according to the first preferred embodiment of the present invention.

Next, control of the cleaning device in the case where the determination criteria are determination criteria of the same type, that is, the first threshold with which the electrical characteristic value detected by the monitor 30 is compared, and the second threshold different from the first threshold, will be described. FIG. 4 is a timing chart for illustrating control of the cleaning device of the image capturing apparatus according to the first preferred embodiment of the present invention. In the timing chart shown in FIG. 4, the top row shows the waveform of a differential value $\Delta fr$ obtained by subtracting the frequency f0 that is an initial value from the resonant frequency fr read from the monitor 30, and the bottom row shows the waveform to provide an instruction to adjust the level of cleaning mode to the vibrator 12.

First, in an initial state (time 0), the controller 20 controls the mode to a monitor operation mode in which the resonant frequency fr being monitored is the frequency f0, the set value (amplitude width) of a control signal is V0 (for example, 3 V), and the operation of the discharge device 50 is in the off state.

The controller 20 may directly compare the value of the resonant frequency fr read from the monitor 30 with the determination criteria read from the storage 40. However, in the present preferred embodiment, the differential value $\Delta fr$ obtained by subtracting the frequency f0 that is an initial value from the read resonant frequency fr is compared with the determination criteria as an electrical characteristic value. The controller 20 determines the amount and condition of adherents on the protective cover 2 by evaluating the differential value $\Delta fr$ based on the determination criteria.

In the case of a state (A) where foreign matter (for example, water) is adhered to the protective cover 2, the controller 20 determines that a relatively small amount of foreign matter is adhered to the protective cover 2 because the differential value $\Delta fr$ is greater than the first threshold and less than or equal to the second threshold of the determination criteria. The controller 20 operates the vibrator 12 in a low cleaning mode by setting a set amplitude width value V1 (for example, about 10 V) to set low vibrations to the vibrator 12 to remove the adherent foreign matter. The vibrator 12 removes the foreign matter adhered to the protective cover 2 by vibrating the protective cover 2 in the low cleaning mode.

The foreign matter adhered to the protective cover 2 reduces as a result of the operation of the vibrator 12 by the controller 20, and the differential value $\Delta fr$ also reduces accordingly. In the case of a state (B) where adherent foreign matter is reduced, the controller 20 determines that the adherent foreign matter is removed because the differential value $\Delta fr$ is less than or equal to the first threshold of the determination criteria. Then, to return the cleaning device to the monitor operation mode, the controller 20 operates the vibrator 12 by setting the set amplitude width value V0 to the vibrator 12. The vibrator 12 causes the protective cover 2 to vibrate in the monitor operation mode.

Subsequently, in the case of a state (C) where foreign matter (for example, water) is adhered to the protective cover 2, the controller 20 determines that a relatively large amount of foreign matter is adhered to the protective cover 2 because the differential value $\Delta fr$ is greater than the first threshold and greater than the second threshold of the determination criteria. The controller 20 operates the vibrator 12 in a high cleaning mode by setting a set amplitude width value V2 (for example, about 15 V) to set high vibrations to the vibrator 12 to remove the adherent foreign matter. The vibrator 12 strongly removes the foreign matter adhered to the protective cover 2 by highly vibrating the protective cover 2 in the high cleaning mode.

The foreign matter adhered to the protective cover 2 reduces as a result of the operation of the vibrator 12 by the controller 20, and the differential value $\Delta fr$ also reduces accordingly. In the case of a state (D) where adherent foreign matter is reduced, the controller 20 determines that adherent foreign matter is removed into a relatively small amount because the differential value $\Delta fr$ is greater than the first threshold and less than or equal to the second threshold of the determination criteria. The controller 20 operates the vibrator 12 in the low cleaning mode to remove a relatively small amount of foreign matter.

The controller 20 acquires that foreign matter adherent to the protective cover 2 further reduces as a result of the operation of the vibrator 12 and the differential value $\Delta fr$ also further reduces accordingly. In the case of a state (E) where adherent foreign matter is further reduced, the controller 20 determines that the adherent foreign matter is removed because the differential value $\Delta fr$ is less than or equal to the first threshold of the determination criteria. Then, to return the cleaning device to the monitor operation mode, the controller 20 operates the vibrator 12 by setting the set amplitude width value V0 to the vibrator 12. The vibrator 12 causes the protective cover 2 to vibrate in the monitor operation mode.

Figure 5:
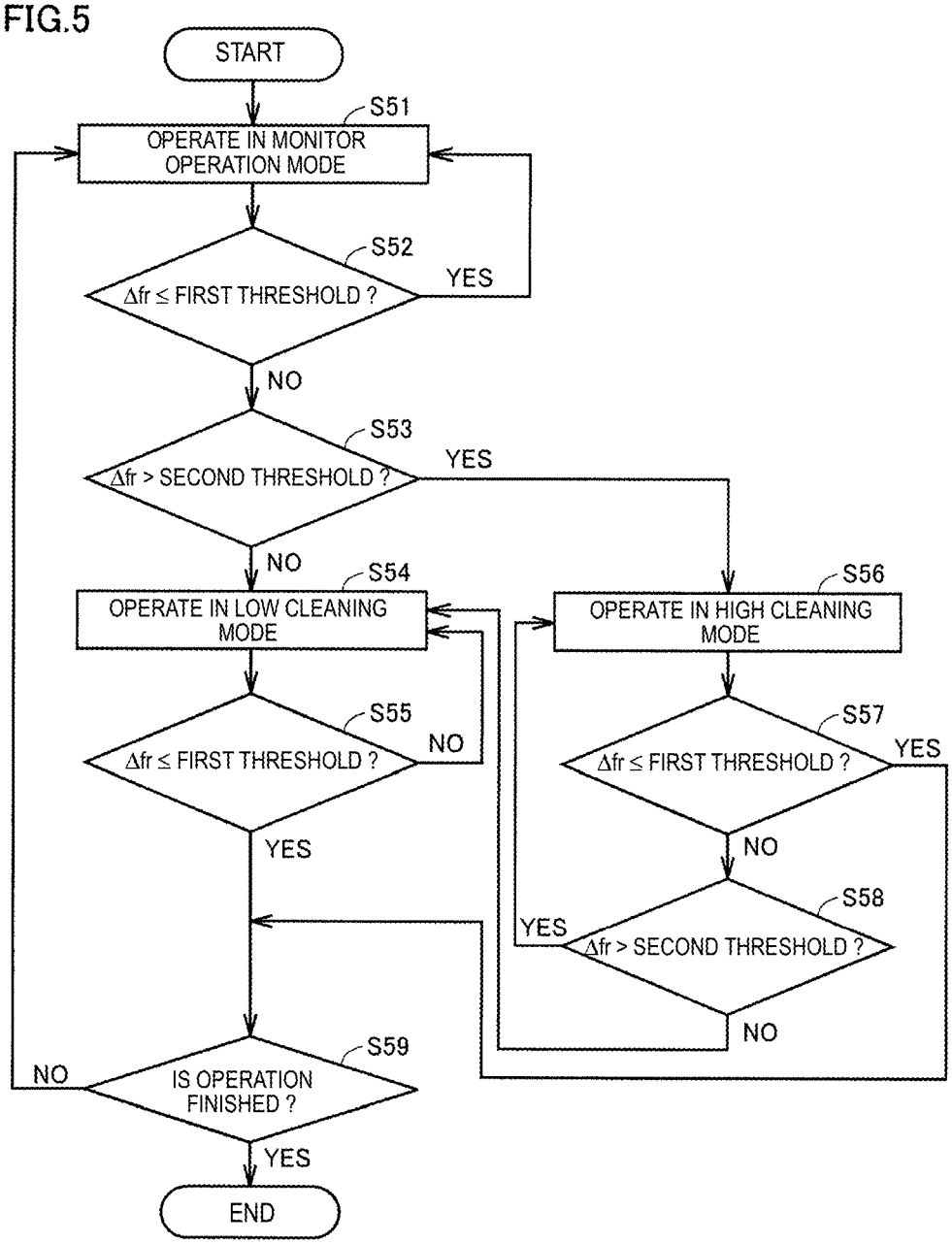
FIG. 5 is a flowchart for illustrating control of the cleaning device of the image capturing apparatus according to the first preferred embodiment of the present invention.

Control of the cleaning device, shown in FIG. 4, will be described with reference to a flowchart. FIG. 5 is a flowchart for illustrating control of the cleaning device of the image capturing apparatus according to the first preferred embodiment of the present invention. First, the controller 20 operates the vibrator 12 in the monitor operation mode (step S51). The controller 20 determines whether the differential value $\Delta fr$ of the electrical characteristic value being monitored is less than or equal to the first threshold of the determination criteria (step S52). When the differential value $\Delta fr$ is less than or equal to the first threshold (YES in step S52), the controller 20 returns the process to step S51 and causes the vibrator 12 to continue operating in the monitor operation mode.

When the differential value $\Delta fr$ is greater than the first threshold (NO in step S52), the controller 20 determines whether the differential value $\Delta fr$ of the electrical characteristic value being monitored is greater than the second threshold of the determination criteria (step S53). When the differential value $\Delta fr$ is less than or equal to the second threshold (NO in step S53), the controller 20 causes the vibrator 12 to operate in the low cleaning mode (step S54). While the controller 20 is causing the vibrator 12 to operate in the low cleaning mode, the controller 20 determines whether the differential value $\Delta fr$ of the electrical characteristic value being monitored is less than or equal to the first threshold (step S55). When the differential value $\Delta fr$ is greater than the first threshold (NO in step S55), the controller 20 returns the process to step S54 and causes the vibrator 12 to continue operating in the low cleaning mode.

Referring back to step S53, when the differential value $\Delta fr$ is greater than the second threshold (YES in step S53), the controller 20 causes the vibrator 12 to operate in the high cleaning mode (step S56). While the controller 20 is causing the vibrator 12 to operate in the high cleaning mode, the controller 20 determines whether the differential value $\Delta fr$ of the electrical characteristic value being monitored is less than or equal to the first threshold (step S57). When the differential value $\Delta fr$ is greater than the first threshold (NO in step S57), the controller 20 determines whether the differential value Δfr of the electrical characteristic value being monitored is greater than the second threshold (step S58).

When the differential value Δfr is less than or equal to the second threshold (NO in step S58), the controller 20 returns the process to step S54 and causes the vibrator 12 to operate in the low cleaning mode. When the differential value Δfr is greater than the second threshold (YES in step S58), the controller 20 returns the process to step S56 and causes the vibrator 12 to continue operating in the high cleaning mode.

When the differential value Δfr is less than or equal to the first threshold in step S55 or step S57 (YES), the controller 20 determines whether an action to finish the operation has been received (step S59). Specifically, for example, an action to turn off the power of the image capturing apparatus is the action to finish the operation. When the action to finish the operation has been received (YES in step S59), the controller 20 ends the process. When the action to finish the operation has not been received (NO in step S59), the controller 20 returns the process to step S51 and causes the vibrator 12 to continue operating in the monitor operation mode.

As described above, the image capturing apparatus 100 according to the first preferred embodiment includes the cleaning device. The cleaning device includes the casing 1 holding the image capturing device 5, the protective cover 2 disposed in the visual field of the image capturing device 5, the vibrator 12 configured to vibrate the protective cover 2, the controller 20 configured to control the vibrator 12, the monitor 30 configured to detect the electrical characteristic value associated with vibrations of the vibrator 12, and the storage 40 configured to store determination criteria based on which the controller 20 evaluates the electrical characteristic value detected by the monitor 30. The controller 20 is configured to evaluate the electrical characteristic value based on the plurality of determination criteria stored in the storage 40 and clean the surface of the translucent body by controlling the vibrator 12 according to the determination.

Therefore, the cleaning device according to the first preferred embodiment is able to acquire the amount and condition of adherents on the protective cover 2 (the status of the protective cover 2) by evaluating the electrical characteristic value detected by the monitor 30 based on the plurality of determination criteria. The cleaning device is able to control the level of cleaning according to the determination and is able to reduce excessive cleaning or insufficient cleaning.

In the cleaning device according to the present preferred embodiment, the plurality of determination criteria includes the first threshold with which the electrical characteristic value detected by the monitor 30 is compared, and the second threshold different from the first threshold. The controller 20 controls the vibrator 12 such that the protective cover 2 is vibrated at a low level (first level) when the electrical characteristic value detected by the monitor 30 is greater than the first threshold and the protective cover 2 is vibrated at a high level (second level) when the electrical characteristic value detected by the monitor 30 is greater than the second threshold. The description is provided on the assumption that the first threshold is less than the second threshold. Alternatively, the first threshold may be greater than the second threshold.

Therefore, the cleaning device according to the first preferred embodiment determines the amount and condition of adherents on the protective cover 2 by evaluating the electrical characteristic value based on the first threshold and the second threshold, and is able to determine the level of cleaning according to the determination.

Since the cleaning device according to the first preferred embodiment detects the electrical characteristic value with the monitor 30 at set intervals, the cleaning device is able to monitor vibrations of the vibrator 12 and is able to start cleaning the protective cover 2 by quickly detecting adhesion of foreign matter to the protective cover 2. In addition, the cleaning device according to the first preferred embodiment is able to determine the amount and condition of adherents on the protective cover 2 by comparing the plurality of determination criteria (for example, the first threshold and the second threshold) with the electrical characteristic value. Therefore, the cleaning device is able to efficiently set the level to vibrate the protective cover 2 according to the amount and condition of adherents.

The cleaning device according to the first preferred embodiment determines the amount and condition of adherents on the protective cover 2. Therefore, the cleaning device does not consume unnecessary electric power by vibrating the protective cover 2 more than necessary. In addition, the cleaning device according to the first preferred embodiment determines the amount and condition of adherents on the protective cover 2. Therefore, control for removing adherent foreign matter by gradually increasing the level of vibrations is not necessary, so the duration of cleaning is shortened.

In the above description, the controller 20 calculates the differential value Δfr by subtracting the frequency f0 from the read resonant frequency fr. Here, it is assumed that the frequency f0 is a value in the initial state where no foreign matter is adherent to the protective cover 2. Alternatively, the frequency f0 may be a value that is acquired each time at timing, such as at the time of power on or a fixed value stored in advance. When the frequency f0 is acquired each time, the state where no foreign matter is adherent at a current point in time can be advantageously re-defined as an initial value even when the characteristics of the piezoelectric resonator change with time. On the other hand, when the frequency f0 is a fixed value, the risk of setting an initial value without realizing adherent foreign matter in the initial state is advantageously avoided.

In the above description, the resonant frequency fr of the self-excited circuit is used as the electrical characteristic value. Specifically, a method of reading the resonant frequency fr is, for example, a method in which a frequency-voltage conversion circuit is assembled to the self-excited circuit and the resonant frequency fr is read as a voltage value. The electrical characteristic value is not limited to the resonant frequency fr, and may be, for example, a resonant impedance, a resonant impedance ratio, and an electric current value consumed by the driver circuit.

Second Preferred Embodiment

In the cleaning device according to the first preferred embodiment, the controller 20 just controls the level of vibrations of the vibrator 12 according to the amount and condition of adherents on the protective cover 2. In a cleaning device according to the present preferred embodiment, a configuration of executing control to clean with a cleaning solution discharged from the cleaning nozzle other than vibrations of the vibrator 12 according to the amount and condition of adherents on the protective cover 2 will be described.

Figure 6:
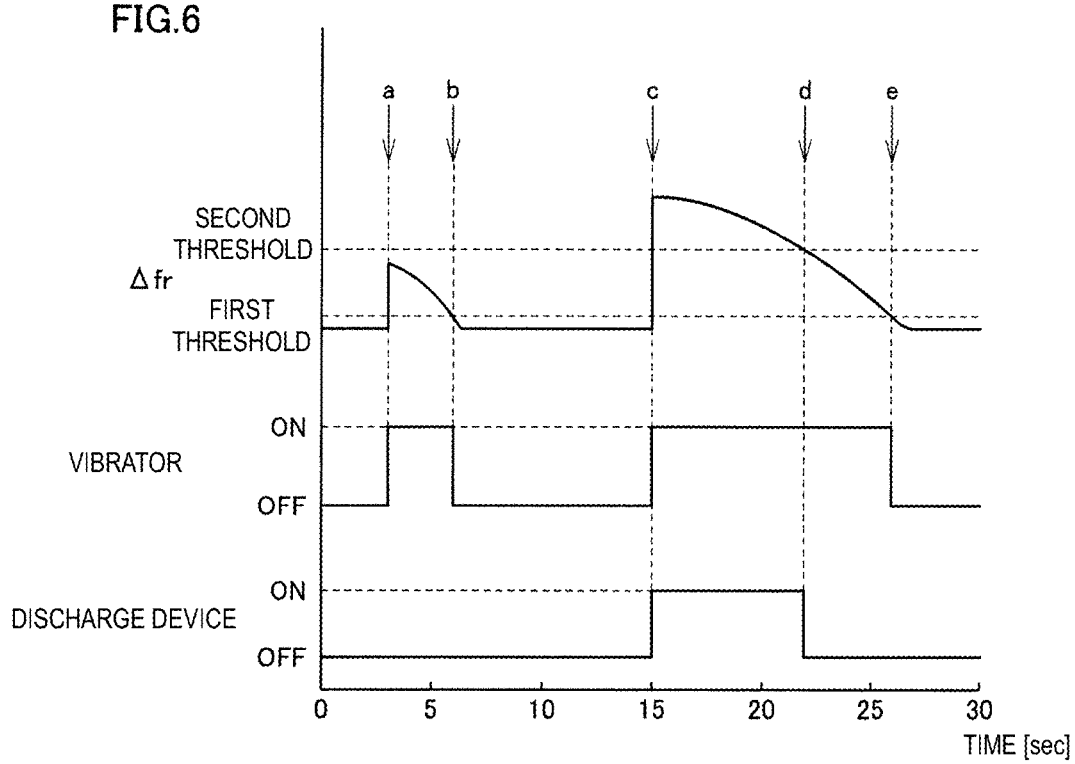
FIG. 6 is a timing chart for illustrating control of a cleaning device of an image capturing apparatus according to a second preferred embodiment of the present invention.

FIG. 6 is a timing chart for illustrating control of the cleaning device of an image capturing apparatus according to the second preferred embodiment of the present invention. In the timing chart shown in FIG. 6, the top row shows the waveform of a differential value Δfr obtained by subtracting the frequency f0 that is an initial value from the resonant frequency fr read from the monitor 30, the middle row shows the waveform to provide an instruction to cause the vibrator 12 to perform an operation in a cleaning mode, and the bottom row shows the waveform to provide an instruction to cause the discharge device 50 to perform an operation to discharge cleaning solution.

First, in an initial state (time 0), the controller 20 controls the cleaning device into a monitor operation mode in which the resonant frequency fr being monitored is the frequency f0, the set value (amplitude width) of a control signal is V0 (for example, about 3 V), and the operation of the discharge devise 50 is in the off state.

The controller 20 uses the differential value Δfr obtained by subtracting the frequency f0 that is the initial value from the read resonant frequency fr as an electrical characteristic value, evaluates the differential value Δfr based on determination criteria, and determines the amount and condition of adherents on the protective cover 2.

In the case of a state (a) where foreign matter (for example, water) is adherent to the protective cover 2, the controller 20 determines that a relatively small amount of foreign matter is adherent because the differential value Δfr is greater than the first threshold and less than or equal to the second threshold of the determination criteria. The controller 20 causes the vibrator 12 to operate in the cleaning mode by setting a set amplitude width value V3 (for example, about 10 V) to set vibrations to the vibrator 12 to remove the adherent foreign matter. The vibrator 12 removes the foreign matter adhered to the protective cover 2 by vibrating the protective cover 2 in the cleaning mode.

The foreign matter adhered to the protective cover 2 reduces as a result of the operation of the vibrator 12 by the controller 20, and the differential value Δfr also reduces accordingly. In the case of a state (b) where adherent foreign matter is reduced, the controller 20 determines that the adherent foreign matter is removed because the differential value Δfr is less than or equal to the first threshold of the determination criteria. Then, to return the cleaning device to the monitor operation mode, the controller 20 operates the vibrator 12 by setting the set amplitude width value V0 to the vibrator 12. The vibrator 12 causes the protective cover 2 to vibrate in the monitor operation mode.

Subsequently, in the case of a state (c) where foreign matter (for example, water) is adhered to the protective cover 2, the controller 20 determines that a relatively large amount of foreign matter is adhered because the differential value Δfr is greater than the first threshold and greater than the second threshold of the determination criteria. The controller 20 causes the vibrator 12 to operate in the cleaning mode and cause the discharge device 50 to operate by outputting an on signal to discharge cleaning solution to the discharge device 50 to remove the adherent foreign matter. The discharge device 50 strongly removes the foreign matter adhered on the protective cover 2 by discharging cleaning solution to the protective cover 2.

The foreign matter adhered to the protective cover 2 reduces as a result of the operation of the vibrator 12 by the controller 20, and the differential value Δfr also reduces accordingly. In the case of a state (d) where adherent foreign matter is reduced, the controller 20 determines that adherent foreign matter is removed into a relatively small amount because the differential value Δfr is greater than the first threshold and less than or equal to the second threshold of the determination criteria. The controller 20 causes the discharge device 50 to stop by outputting an off signal to not discharge cleaning solution to the discharge device 50 and causes only the vibrator 12 to operate to remove a relatively small amount of foreign matter.

As is apparent from FIG. 6, the cleaning device cleans by causing the vibrator 12 to vibrate the protective cover 2 and discharging cleaning solution to the protective cover 2 to highly clean the protective cover 2 from the state (c) to the state (d). However, the configuration is not limited thereto. The cleaning device may stop the cleaning operation to vibrate the protective cover 2 with the vibrator 12 in an on period during which cleaning solution is discharged, and may be operated in the monitor operation mode. Alternatively, the cleaning device may use three determination criteria and may perform cleaning in three stages, that is, only cleaning to vibrate the protective cover 2 with the vibrator 12, only cleaning by discharging cleaning solution to the protective cover 2, and cleaning by vibrating the protective cover 2 with the vibrator 12 and discharging the cleaning solution to the protective cover 2.

The foreign matter adhered to the protective cover 2 further reduces as a result of the operation of the vibrator 12 by the controller 20, and the differential value Δfr also further reduces accordingly. In the case of a state (e) where adherent foreign matter is further reduced, the controller 20 determines that the adherent foreign matter is removed because the differential value Δfr is less than or equal to the first threshold of the determination criteria. Then, to return the cleaning device to the monitor operation mode, the controller 20 operates the vibrator 12 by setting the set amplitude width value V0 to the vibrator 12. The vibrator 12 causes the protective cover 2 to vibrate in the monitor operation mode.

Figure 7:
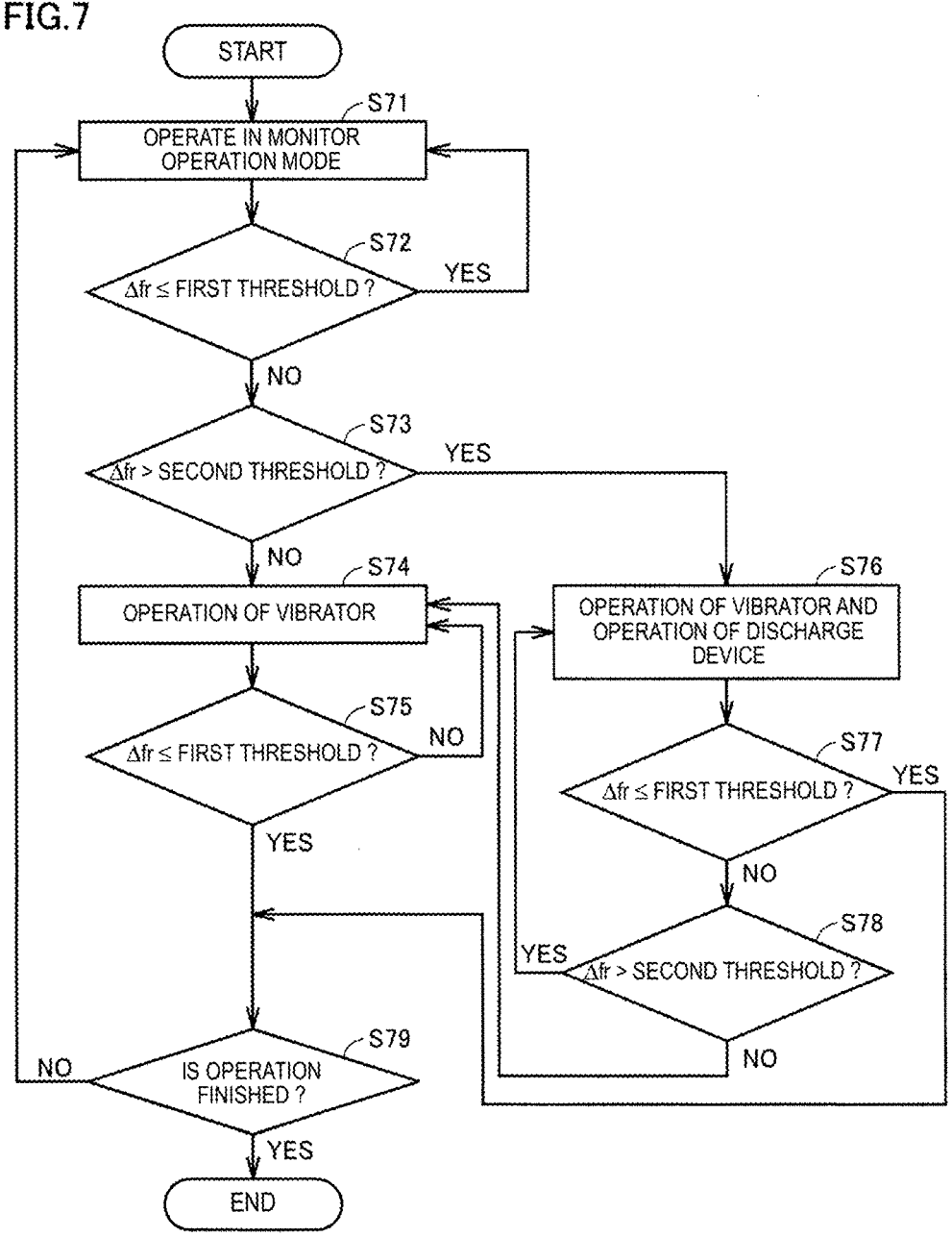
FIG. 7 is a flowchart for illustrating control of the cleaning device of the image capturing apparatus according to the second preferred embodiment of the present invention.

Control of the cleaning device, shown in FIG. 6, will be described with reference to a flowchart. FIG. 7 is a flowchart for illustrating control of the cleaning device of the image capturing apparatus according to the second preferred embodiment of the present invention. First, the controller 20 operates the vibrator 12 in the monitor operation mode (step S71). The controller 20 determines whether the differential value Δfr of the electrical characteristic value being monitored is less than or equal to the first threshold of the determination criteria (step S72). When the differential value Δfr is less than or equal to the first threshold (YES in step S72), the controller 20 returns the process to step S71 and causes the vibrator 12 to continue operating in the monitor operation mode.

When the differential value Δfr is greater than the first threshold (NO in step S72), the controller 20 determines whether the differential value Δfr of the electrical characteristic value being monitored is greater than the second threshold of the determination criteria (step S73). When the differential value Δfr is less than or equal to the second threshold (NO in step S73), the controller 20 causes the vibrator 12 to operate in the cleaning mode (step S74). While the controller 20 is causing the vibrator 12 to operate in the cleaning mode as well, the controller 20 determines whether the differential value Δfr of the electrical characteristic value being monitored is less than or equal to the first threshold (step S75). When the differential value Δfr is greater than the first threshold (NO in step S75), the controller 20 returns the process to step S74 and causes the vibrator 12 to continue operating in the cleaning mode.

Referring back to step S73, when the differential value Δfr is greater than the second threshold (YES in step S73), the controller 20 operates the discharge device 50 to discharge cleaning solution (step S76). While the controller 20 is causing the discharge device 50 to perform the operation of discharging cleaning solution, the controller 20 executes control to operate the vibrator 12 in the cleaning mode. Alternatively, the controller 20 may execute control to not operate the vibrator 12 in the cleaning mode. While the controller 20 is causing the discharge device 50 to perform the operation of discharging cleaning solution as well, the controller 20 determines whether the differential value Δfr of the electrical characteristic value being monitored is less than or equal to the first threshold (step S77). When the differential value Δfr is greater than the first threshold (NO in step S77), the controller 20 determines whether the differential value Δfr of the electrical characteristic value being monitored is greater than the second threshold (step S78).

When the differential value Δfr is less than or equal to the second threshold (NO in step S78), the controller 20 returns the process to step S74 and causes the vibrator 12 to operate in the cleaning mode without causing the discharge device 50 to discharge cleaning solution. When the differential value Δfr is greater than the second threshold (YES in step S78), the controller 20 returns the process to step S76 and causes the discharge device 50 to continue operating to discharge cleaning solution.

When the differential value Δfr is less than or equal to the first threshold in step S75 or step S77 (YES), the controller 20 determines whether an action to finish the operation has been received (step S79). When the action to finish the operation has been received (YES in step S79), the controller 20 ends the process. When the action to finish the operation has not been received (NO in step S79), the controller 20 returns the process to step S71 and causes the vibrator 12 to continue operating in the monitor operation mode.

As described above, the cleaning device according to the second preferred embodiment further includes the discharge device that discharges a cleaning solution to the surface of the protective cover 2. When the electrical characteristic value detected by the monitor 30 is greater than the second threshold, the controller 20 causes the discharge device 50 to discharge a cleaning solution.

When cleaning is performed by only vibrating the protective cover 2, water, a small amount of snow, or the like, can be removed. However, it may be difficult to sufficiently clean firmly adhered mud, oil, or the like. For this reason, in the cleaning device according to the second preferred embodiment, cleaning using the discharge device 50 having a strong force (cleaning performance) of removing adherents is used rather than cleaning by vibrating the protective cover 2. However, since cleaning using the discharge device 50 uses cleaning solution, when cleaning solution is used regardless of the amount and condition of adherents, a large amount of cleaning solution needs to be held in a tank. This leads to an increase in the weight of a vehicle and may deteriorate fuel efficiency.

The cleaning device according to the second preferred embodiment cleans the protective cover 2 by a combination of cleaning by vibrating the protective cover 2 and cleaning using the discharge device 50 according to the amount and condition of adherents. Specifically, the cleaning device uses cleaning by vibrating the protective cover 2 when the amount and condition of adherents is light and uses cleaning using the discharge device 50 when the amount and condition of adherents is severe, thus reducing the amount of cleaning solution used. In addition, when the amount and condition of adherents is severe, the cleaning device coordinates cleaning using the discharge device 50 with vibrations of the protective cover 2. Thus, the cleaning device is able to efficiently remove adherents as compared to when cleaning using the discharge device 50 is merely performed.

Of course, the controller 20 may perform cleaning only by causing the discharge device 50 to discharge a cleaning element instead of cleaning by vibrating the protective cover 2, when the electrical characteristic value detected by the monitor 30 is greater than the second threshold. The cleaner from the discharge device 50 may not be cleaning solution, but instead, air, for example. When the differential value Δfr is greater than the first threshold of the determination criteria and less than or equal to the second threshold, the controller 20 may clean the protective cover 2 by causing the discharge device 50 to discharge air. When the differential value Δfr is greater than the second threshold, the controller 20 may clean the protective cover 2 by causing the vibrator 12 to operate in the cleaning mode.

Third Preferred Embodiment

In the cleaning device according to the first preferred embodiment, the case where the determination criteria are determination criteria of the same type like the first threshold with which the electrical characteristic value detected by the monitor 30 is compared, and the second threshold different from the first threshold, is described. In a cleaning device according to the present preferred embodiment, the case where the determination criteria are different types will be described.

Figure 8:
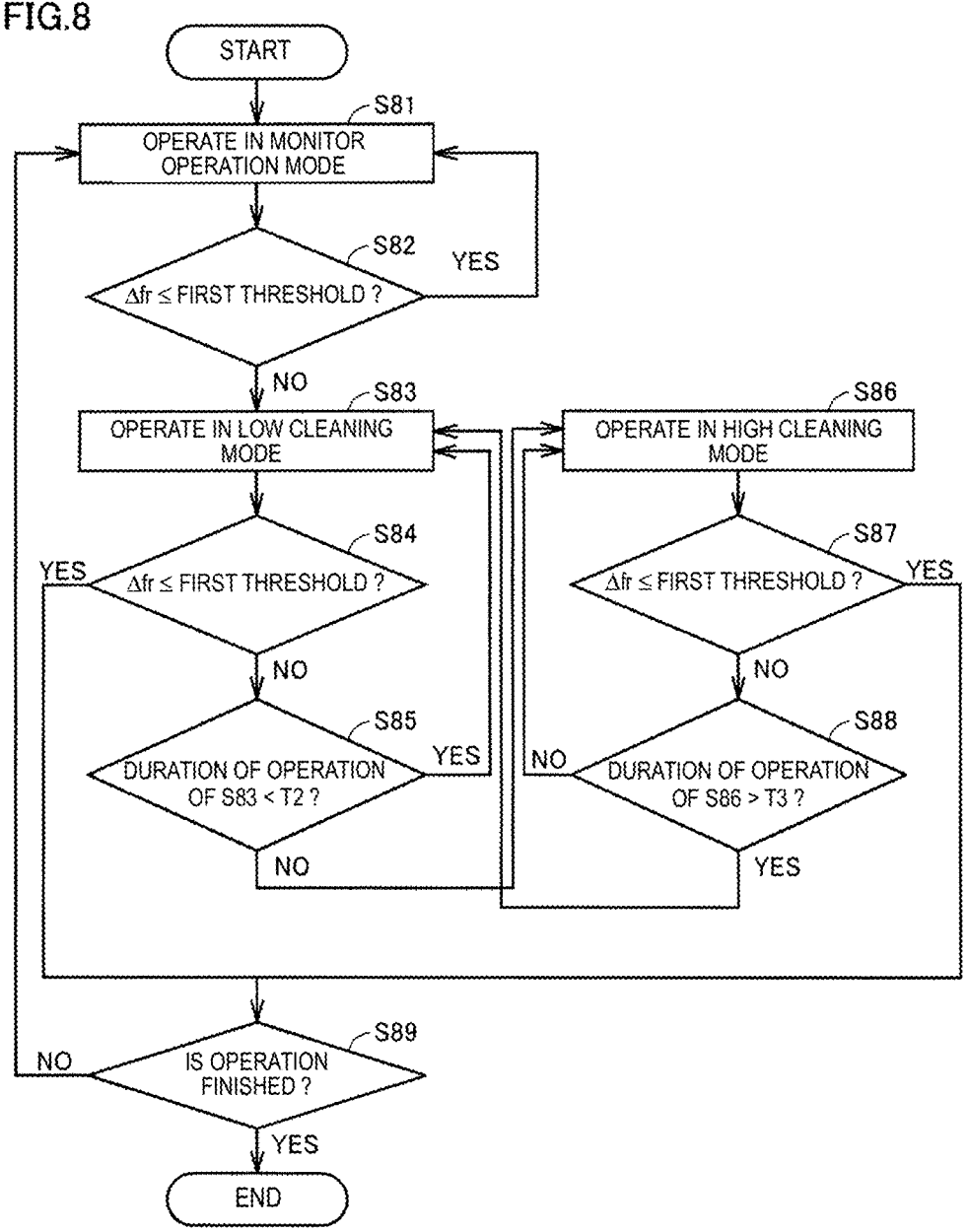
FIG. 8 is a flowchart for illustrating control of a cleaning device of an image capturing apparatus according to a third preferred embodiment of the present invention.

It is assumed that the determination criteria according to the present preferred embodiment are determination criteria of different types such as a threshold with which the electrical characteristic value detected by the monitor 30 is compared, and a duration of control. FIG. 8 is a flowchart for illustrating control of the cleaning device of an image capturing apparatus according to the third preferred embodiment of the present invention. First, the controller 20 operates the vibrator 12 in the monitor operation mode (step S81). The controller 20 determines whether the differential value Δfr of the electrical characteristic value being monitored is less than or equal to the first threshold of the determination criteria (step S82). When the differential value Δfr is less than or equal to the first threshold (YES in step S82), the controller 20 returns the process to step S81 and causes the vibrator 12 to continue operating in the monitor operation mode.

When the differential value Δfr is greater than the first threshold (NO in step S82), the controller 20 causes the vibrator 12 to operate in the low cleaning mode (step S83). While the controller 20 is causing the vibrator 12 to operate in the low cleaning mode as well, the controller 20 determines whether the differential value Δfr of the electrical characteristic value being monitored is less than or equal to the first threshold (step S84). When the differential value Δfr is greater than the first threshold (NO in step S84), the controller 20 determines whether the duration of operation in the low cleaning mode is shorter than a T2 time period of the determination criteria (step S85). When the duration is shorter than the T2 time period (YES in step S85), the controller 20 returns the process to step S83 and causes the vibrator 12 to continue operating in the low cleaning mode.

When the duration is longer than or equal to the T2 time period (NO in step S85), the controller 20 causes the vibrator 12 to operate in the high cleaning mode (step S86). In other words, even when cleaning by vibrating the protective cover 2 is performed for the T2 time period, the status of adherents does not change, so the controller 20 causes the vibrator 12 to operate in the high cleaning mode having a higher cleaning performance. While the controller 20 is causing the vibrator 12 to operate in the high cleaning mode as well, the controller 20 determines whether the differential value Δfr of the electrical characteristic value being monitored is less than or equal to the first threshold (step S87). When the differential value Δfr is greater than the first threshold (NO in step S87), the controller 20 determines whether the duration of operation in the high cleaning mode is longer than a T3 time period of the determination criteria (step S88).

When the duration is shorter than or equal to the T3 time period (NO in step S88), the controller 20 returns the process to step S86 and causes the vibrator 12 to continue operating in the high cleaning mode. When the duration is longer than the T3 time period (YES in step S88), the controller 20 returns the process to step S83 and causes the vibrator 12 to operate in the low cleaning mode.

When the differential value Δfr is less than or equal to the first threshold in step S84 or step S87 (YES), the controller 20 determines whether an action to finish the operation has been received (step S89). Specifically, for example, an action to turn off the power of the image capturing apparatus is the action to finish the operation. When the action to finish the operation has been received (YES in step S89), the controller 20 ends the process. When the action to finish the operation has not been received (NO in step S89), the controller 20 returns the process to step S81 and causes the vibrator 12 to continue operating in the monitor operation mode.

As described above, in the cleaning device according to the third preferred embodiment, the plurality of determination criteria includes the threshold with which the electrical characteristic value detected by the monitor 30 is compared, and the duration of control. The controller 20 controls the vibrator 12 such that the protective cover 2 is vibrated at a low level (first level) when the electrical characteristic value detected by the monitor 30 exceeds the threshold, and, after a lapse of the duration of vibrations at the low level (first level), the protective cover 2 is vibrated at a high level (second level) different from the low level (first level) when the electrical characteristic value detected by the monitor 30 exceeds the threshold.

Therefore, the cleaning device according to the third preferred embodiment is able to determine the amount and condition of adherents on the protective cover 2 (the status of the protective cover 2) by evaluating vibrations of the vibrator 12, detected by the monitor 30, based on the determination criteria of different types. The cleaning device according to the third preferred embodiment is able to control the level of cleaning according to the amount and condition of adherents on the protective cover 2, and is able to reduce excessive cleaning or insufficient cleaning.

The cleaning device may be configured to, even after a lapse of the duration of vibrations at the low level (first level), when the electrical characteristic value detected by the monitor exceeds the threshold, cause the discharge device 50 to discharge a cleaning solution. The cleaning device may be configured to, even after a lapse of the duration of vibrations at the low level (first level), when the electrical characteristic value detected by the monitor 30 exceeds the threshold, cause the discharge device 50 to discharge a cleaning solution instead of control for vibrating the protective cover 2 at the high level (second level). When the duration of cleaning with the discharge device 50 is limited (for example, shorter than or equal to the T3 time period), adherents can be further efficiently removed, and the inconvenience that the cleaning solution continues being discharged although adherents have been removed by discharging the cleaning solution to the protective cover 2 can be avoided. In addition, the cleaning element from the discharge device 50 may be not cleaning solution but air. The controller 20 may be configured to, when the differential value Δfr exceeds the threshold of the determination criteria, clean the protective cover 2 by causing the discharge device 50 to discharge air and, even after a lapse of the duration of discharge of air, when the electrical characteristic value detected by the monitor 30 exceeds the threshold, clean the protective cover 2 by causing the vibrator 12 to operate in the cleaning mode. The controller 20 may be configured to, while the discharge device 50 is cleaning the protective cover 2 by discharging air, cause the vibrator 12 to vibrate the protective cover 2.

Fourth Preferred Embodiment

In the cleaning device according to the first preferred embodiment, the controller 20 just controls the level of vibrations of the vibrator 12 according to the amount and condition of adherents on the protective cover 2. In a cleaning device according to the present preferred embodiment, control for cleaning the protective cover 2 by discharging cleaning substances having different cleaning performances according to the amount and condition of adherents on the protective cover 2 will be described.

In the cleaning device according to the present preferred embodiment, in addition to the cleaning nozzle 3 shown in FIG. 1, a blower nozzle (not shown) that discharges air is provided in the casing 1. Discharge of air from the blower nozzle is controlled when the controller 20 provides an instruction to the discharge device 50 for an on state to discharge air or an off state not to discharge air.

Figure 9:
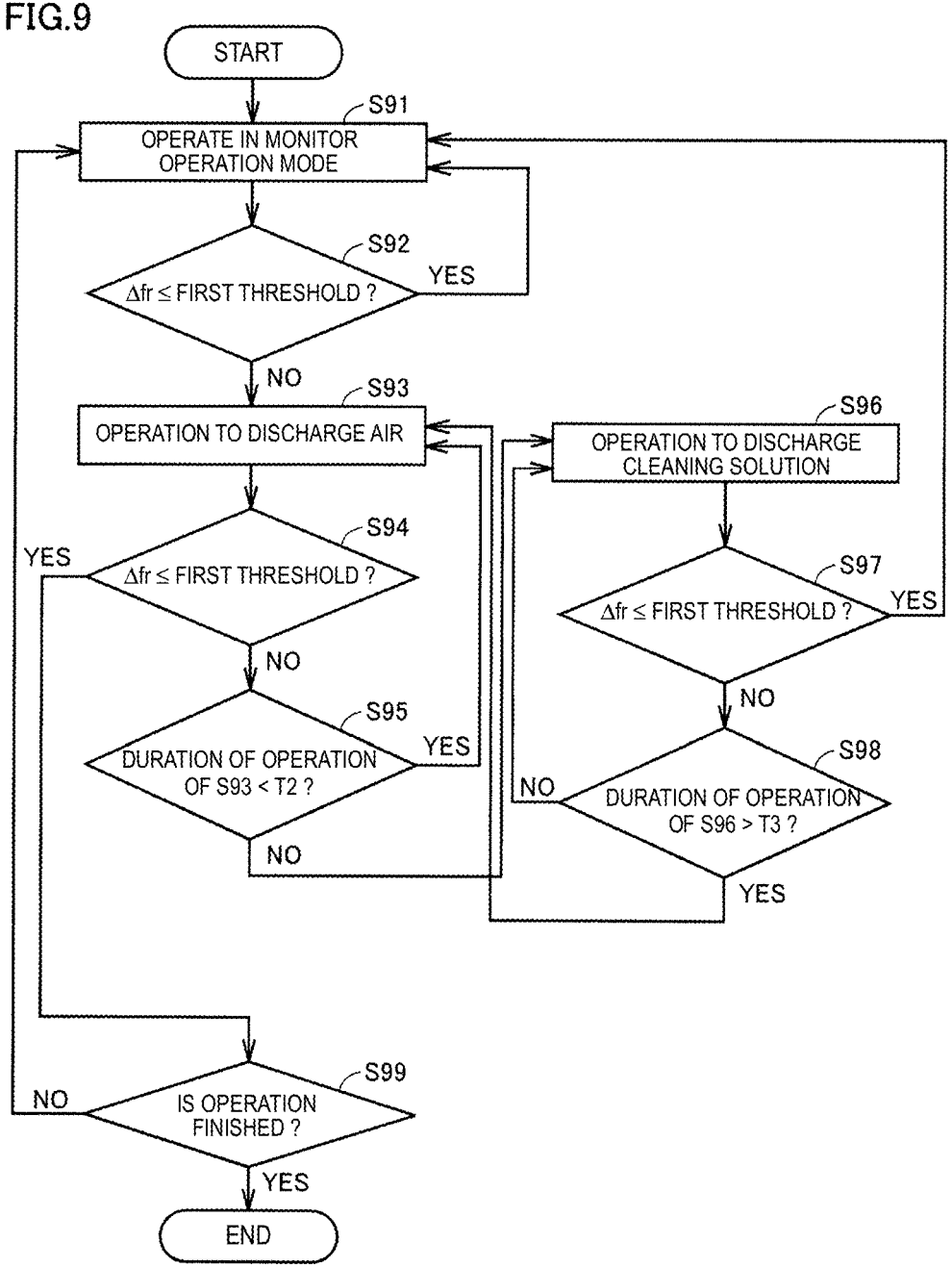
FIG. 9 is a flowchart for illustrating control of a cleaning device of an image capturing apparatus according to a fourth preferred embodiment of the present invention.

FIG. 9 is a flowchart for illustrating control of the cleaning device of an image capturing apparatus according to the fourth preferred embodiment of the present invention. First, the controller 20 operates the vibrator 12 in the monitor operation mode (step S91). The controller 20 determines whether the differential value Δfr of the electrical characteristic value being monitored is less than or equal to the first threshold of the determination criteria (step S92). When the differential value Δfr is less than or equal to the first threshold (YES in step S92), the controller 20 returns the process to step S91 and causes the vibrator 12 to continue operating in the monitor operation mode.

When the differential value Δfr is greater than the first threshold (NO in step S92), the controller 20 causes the discharge device 50 to operate to discharge air (first cleaning substance) from the blower nozzle (step S93). While the controller 20 is causing the discharge device 50 to perform the operation to discharge air (first cleaning element) as well, the controller 20 determines whether the differential value Δfr of the electrical characteristic value being monitored is less than or equal to the first threshold (step S94). When the differential value Δfr is greater than the first threshold (NO in step S94), the controller determines whether the duration during which the discharge device 50 is being caused to perform the operation to discharge air (first cleaning element) is shorter than the T2 time period of the determination criteria (step S95). When the duration is shorter than the T2 time period (YES in step S95), the controller 20 returns the process to step S93 and causes the discharge device 50 to continue performing the operation to discharge air (first cleaning substance).

When the duration is longer than or equal to the T2 time period (NO in step S95), the controller 20 causes the discharge device 50 to operate to discharge cleaning solution (second cleaning substance) (step S96). In other words, even when cleaning by discharging air (first cleaning substance) is performed for the T2 time period, the status of adherents does not change, so the controller 20 performs cleaning by discharging cleaning solution (second cleaning substance) having a higher cleaning performance. While the controller 20 is causing the discharge device 50 to perform the operation to discharge cleaning solution, the controller 20 controls the discharge device 50 not to perform the operation to discharge air (cleaning substance). Alternatively, the controller 20 may control the discharge device 50 to perform the operation to discharge air (first cleaning substance). While the controller 20 is causing the discharge device 50 to perform the operation to discharge cleaning solution as well, the controller 20 determines whether the differential value Δfr of the electrical characteristic value being monitored is less than or equal to the first threshold (step S97). When the differential value Δfr is greater than the first threshold (NO in step S97), the controller 20 determines whether the duration of operation in the cleaning mode is longer than the T3 time period of the determination criteria (step S98).

When the duration is shorter than or equal to the T3 time period (NO in step S98), the controller 20 returns the process to step S96 and causes the discharge device 50 to continue operating in setting to discharge cleaning solution. When the duration is longer than the T3 time period (YES in step S98), the controller 20 returns the process to step S93 and causes the discharge device 50 not to discharge cleaning solution but to perform the operation to discharge air. In other words, to avoid cleaning solution in the image capturing range for a long time, the controller 20 executes control such that cleaning using cleaning solution is not performed longer than the T3 time period.

When the differential value Δfr is less than or equal to the first threshold in step S94 (YES), the controller 20 determines whether an action to finish the operation has been received (step S99). Specifically, for example, an action to turn off the power of the image capturing apparatus is the action to finish the operation. When the action to finish the operation has been received (YES in step S99), the controller 20 ends the process. When the action to finish the operation has not been received (NO in step S99), the controller 20 returns the process to step S91 and causes the vibrator 12 to continue operating in the monitor operation mode.

As described above, in the cleaning device according to the fourth preferred embodiment, the plurality of determination criteria include the threshold with which the electrical characteristic value detected by the monitor 30 is compared, and the duration of control. The cleaning device further includes the discharge device 50 configured to discharge air (first cleaning substance) to the surface of the protective cover 2 and cleaning solution (second cleaning substance) having a higher cleaning performance than air (first cleaning element). The controller 20 causes the discharge device 50 to discharge air (first cleaning substance) when the electrical characteristic value detected by the monitor 30 exceeds the threshold and, even after a lapse of the duration (T2 time period) of discharge of air (first cleaning substance), causes the discharge device 50 to discharge cleaning solution (second cleaning substance) when the electrical characteristic value detected by the monitor 30 exceeds the threshold.

Therefore, the cleaning device according to the fourth preferred embodiment is able to acquire the amount and condition of adherents on the protective cover 2 (the status of the protective cover 2) by determining vibrations of the vibrator 12, detected by the monitor 30, based on the determination criteria of different types. The cleaning device according to the fourth preferred embodiment is able to control the level of cleaning according to the amount and condition of adherents on the protective cover 2, and is able to reduce excessive cleaning or insufficient cleaning. In the above description, the first cleaning element is air, and the second cleaning element is cleaning solution. However, these are illustrative and not restrictive to this configuration. For example, the first cleaning substance may be water, and the second cleaning element may be cleaning solution.

The cleaning device may cause the discharge device 50 to discharge air (first cleaning substance) when the electrical characteristic value detected by the monitor 30 exceeds the first threshold and cause the discharge device 50 to discharge cleaning solution (second cleaning substance) when the electrical characteristic value detected by the monitor 30 exceeds the second threshold.

Fifth Preferred Embodiment

A fifth preferred embodiment of the present invention is similar to the first and second preferred embodiments, except that the fifth preferred embodiment utilizes three different cleaning operations based on three thresholds of the differential value Δfr of the electrical characteristic value being monitored.

First, the controller 20 operates the vibrator 12 in the monitor operation mode. The controller 20 determines whether the differential value Δfr of the electrical characteristic value being monitored is less than or equal to the first threshold of the determination criteria. When the differential value Δfr is less than or equal to the first threshold, the controller 20 causes the vibrator 12 to continue operating in the monitor operation mode.

When the differential value Δfr is greater than the first threshold, the controller 20 determines whether the differential value Δfr of the electrical characteristic value being monitored is greater than the second threshold of the determination criteria. When the differential value Δfr is less than or equal to the second threshold, the controller 20 causes the vibrator 12 to operate in the low cleaning mode. While the controller 20 is causing the vibrator 12 to operate in the low cleaning mode, the controller 20 also determines whether the differential value Δfr of the electrical characteristic value being monitored is less than or equal to the first threshold. When the differential value Δfr is greater than the first threshold, the controller 20 causes the vibrator 12 to continue operating in the low cleaning mode.

When the differential value Δfr is greater than the second threshold, the controller 20 determines whether the differential value Δfr of the electrical characteristic value being monitored is greater than the third threshold of the determination criteria. When the differential value Δfr is greater than the second threshold and less than or equal to the third threshold, the controller 20 causes the vibrator 12 to operate in the high cleaning mode. While the controller 20 is causing the vibrator 12 to operate in the high cleaning mode, the controller also determines whether the differential value Δfr of the electrical characteristic value being monitored is less than or equal to the first threshold. When the differential value Δfr is greater than the first threshold, the controller 20 determines whether the differential value Δfr of the electrical characteristic value being monitored is greater than the second threshold.

When the differential value Δfr is less than or equal to the second threshold, the controller 20 causes the vibrator 12 to operate in the low cleaning mode. When the differential value Δfr is greater than the second threshold and less than or equal to the third threshold, the controller 20 causes the vibrator 12 to continue operating in the high cleaning mode.

When the differential value Δfr is less than or equal to the first threshold, the controller 20 determines whether an action to finish the operation has been received. When the action to finish the operation has been received, the controller 20 ends the process. When the action to finish the operation has not been received, the controller 20 causes the vibrator 12 to continue operating in the monitor operation mode.

When the differential value Δfr is greater than the third threshold, the controller 20 operates the discharge device 50 to discharge cleaning solution. While the controller 20 is causing the discharge device 50 to perform the operation of discharging cleaning solution, the controller 20 executes control to operate the vibrator 12 in one of the low cleaning mode or the high cleaning mode. Alternatively, the controller 20 may execute control to not operate the vibrator 12 in the low cleaning mode or the high cleaning mode.

When the differential value Δfr is greater than the third threshold, the controller 20 causes the discharge device 50 to continue operating to discharge cleaning solution and causes the vibrator 12 to continue operating in one of the low cleaning mode or the high cleaning mode.

When the differential value Δfr is less than or equal to the third threshold and is greater than the second threshold, the controller 20 causes the vibrator 12 to operate in the high cleaning mode without causing the discharge device 50 to discharge cleaning solution.

When the differential value Δfr is less than or equal to the second threshold and greater than the first threshold, the controller 20 causes the vibrator 12 to operate in the low cleaning mode without causing the discharge device 50 to discharge cleaning solution.

When the differential value Δfr is less than or equal to the first threshold, the controller 20 determines whether an action to finish the operation has been received. When the action to finish the operation has been received, the controller 20 ends the process. When the action to finish the operation has not been received, the controller 20 causes the vibrator 12 to continue operating in the monitor operation mode.

Sixth Preferred Embodiment

A sixth preferred embodiment of the present invention is similar to the fifth preferred embodiment, except that instead of the controller 20 determining whether or not the differential value Δfr is less than or equal a third threshold, the controller 20 determines whether or not there is a sufficient amount of cleaning solution in the discharge device 50 in order to operate the discharge device 50 to discharge cleaning solution.

When the controller 20 determines that the differential value Δfr is greater than the second threshold and when the controller 20 determines that there is an insufficient amount of cleaning solution in the discharge device 50 in order to operate the discharge device 50 to discharge the cleaning solution, the controller 20 causes the vibrator 12 to operate in the high cleaning mode without causing the discharge device 50 to discharge cleaning solution.

When the controller 20 determines that the differential value Δfr is greater than the second threshold and when the controller 20 determines that there is a sufficient amount of cleaning solution in the discharge device 50 in order to operate the discharge device 50 to discharge the cleaning solution, the controller 20 operates the discharge device 50 to discharge cleaning solution and operates the vibrator 12 in one of the low cleaning mode or the high cleaning mode.

The remainder of the process according to the sixth preferred embodiment is the same as or similar to the process according to the fifth preferred embodiment.

Seventh Preferred Embodiment

In the cleaning device according to the first preferred embodiment, the controller 20 controls cleaning to remove adherents on the protective cover 2. In a cleaning device according to the seventh preferred embodiment, a configuration of executing control to identify and provide a warning of a failure of the image capturing apparatus will be described.

As described above, in preferred embodiments of the present invention, the protective cover 2 is fixed to the flange portion 14c, for example, by a bonding material, such as an adhesive. Since the image capturing apparatus 100 is typically exposed to the environment, such as humidity and ultraviolet rays, for example, cracks may occur in the joint between the protective cover 2 and the flange portion 14c. When cracks occur, the cleaning performance of the protective cover 2 is reduced. Further, when cracks occur in the joint between the protective cover 2 and the flange portion 14c, the impedance frequency characteristics of the piezoelectric resonator 15 greatly change. More specifically, the impedance frequency characteristics shift to a lower frequency and/or to a higher impedance. As the cracks worsen, the impedance frequency characteristics continue to shift to an even lower frequency and/or to an even higher impedance.

In addition, the protective cover 2 may completely separate from the flange portion 14c. When the protective cover 2 completely separates from the flange portion 14c, the cleaning performance of the protective cover 2 is further deteriorated. Further, when the protective cover 2 completely separates from the flange portion 14c, the impedance frequency characteristics of the piezoelectric resonator 15 greatly change. More specifically, the impedance frequency characteristics shift to a higher frequency.

The piezoelectric resonator 15 may also gradually separate from a portion of the first cylindrical member 13 and/or a portion of the second cylindrical member 14, or the piezoelectric resonator 15 may be short-circuited. When the piezoelectric resonator 15 separates from the portion of the first cylindrical member 13 and/or the portion of the second cylindrical member 14 or is short-circuited, the impedance frequency characteristics also greatly change.

In order to detect such defects in the image capturing apparatus 100, the controller 20 sweeps a drive frequency, and the current flowing through the piezoelectric resonator 15 is detected by the monitor 30. When the current detected by the monitor 30 is substantially different from a standard value (significantly greater or significantly lower), or when the current detected by the monitor 30 continuously increases or decreases, the controller determines that a crack, separation between the protective cover and the flange portion 14c, separation of the piezoelectric resonator 15 from a portion of the first cylindrical member 13 and/or a portion of the second cylindrical member 14, and/or short-circuiting of the piezoelectric resonator has occurred.

Based on the determination described above, the controller provides a warning that the image capturing apparatus 100 is failing (product failure warning).

Figure 10:
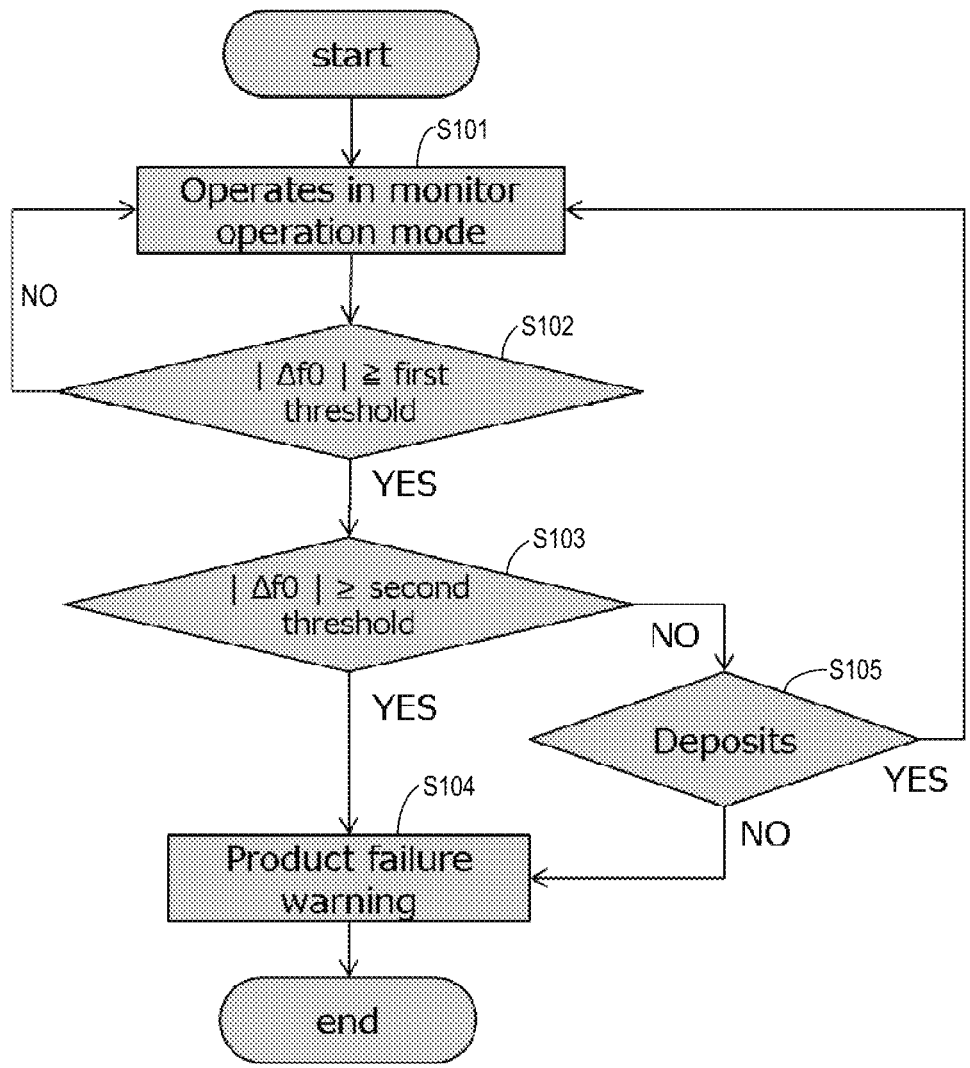
FIG. 10 is a flowchart for illustrating control of a cleaning device of an image capturing apparatus according to a seventh preferred embodiment of the present invention.

FIG. 10 is a flowchart for illustrating control of the cleaning device of the image capturing apparatus according to the seventh preferred embodiment of the present invention. First, the controller 20 operates the vibrator 12 in the monitor operation mode (step S101). The controller 20 determines whether the differential value Δfr of the electrical characteristic value being monitored is greater than or equal to the first threshold of the determination criteria (step S102). When the differential value Δfr is less than or equal to the first threshold (NO in step S102), the controller 20 returns the process to step S101 and causes the vibrator 12 to continue operating in the monitor operation mode.

When the differential value Δfr is greater than the first threshold (YES in step S102), the controller 20 determines whether the differential value Δfr of the electrical characteristic value being monitored is greater than the second threshold of the determination criteria (step S103). When the differential value Δfr is greater than the second threshold (YES in step S103), the controller 20 provides a product failure warning (step S104) that causes the vibrator 12 to stop the vibrator from vibrating. When the differential value Δfr is less than the second threshold (NO in step S103), the controller 20 determines whether or not adherents are adhered to the protective cover 2 (step 105). When the controller determines that no adherents are adhered to the protective cover 2, the controller 20 provides a product failure warning (step S104) that causes the vibrator 12 to stop the vibrator from vibrating. When the controller determines that no adherents are adhered to the protective cover 2, the controller 20 returns the process to step S101 and causes the vibrator 12 to continue operating in the monitor operation mode.

Instead of determining whether or not the image capturing apparatus 100 has failed based on changes in the resonant frequency as described in the seventh preferred embodiment, the cleaning device may determine whether or not the image capturing apparatus has failed based on changes in the impedance, for example.

Other Modifications

In the cleaning device of the image capturing apparatus according to the above-described preferred embodiments, the electrical characteristic value is a resonant frequency fr in the above description. Alternatively, the electrical characteristic value may be at least any one of a resonant frequency fr, an anti-resonant frequency fa, a band width (fa-fr) of resonance, a resonant impedance Zr, an anti-resonant impedance Za, an impedance ratio (|Za/Zr|) of resonance, and a current value I of the driver circuit, or a computed value that is a combination of some of these values.

Generally, the resonant frequency fr and the anti-resonant frequency fa tend to decrease when foreign matter adheres to the protective cover 2, the amount of change tends to increase as the mass of adherents increases and as the amount of foreign matter adhered to the protective cover 2 increases. When mud, or the like, adheres to the protective cover 2, the amount and condition of adherents varies depending on not only the mass or volume but also the viscosity or drying and makes a difference in the effect of reducing vibrations. For this reason, control for detecting the amount of change in the impedance ratio (|Za/Zr|) of resonance as the electrical characteristic value and cleaning the surface of the protective cover 2 in a cleaning mode having a higher capability to remove adherents as the amount of decrease increases is also possible. When the impedance ratio of resonance has decreased, there is also a possibility that the capability of vibrations to remove adherents has decreased, and it may be estimated that the effect of combining other cleaning (for example, cleaning using cleaning solution) is high.

Similarly, in comparison with the case where liquid is adhered on the surface of the protective cover 2 as droplets, when a solid is adhered to the surface of the protective cover 2 such as ice, the degree to which vibrations of resonance are reduced or prevented is large, and the impedance ratio (|Za/Zr|) of resonance also tends to reduce. On the other hand, in a low-temperature environment in which droplets adhere to the surface of the protective cover 2 as ice, the resonant frequency fr or the anti-resonant frequency fa generally tends to increase. Depending on cases, a decrease in the resonant frequency fr due to adhesion of droplets to the surface of the protective cover 2 and an increase in the resonant frequency fr in a low-temperature environment cancel out, so a change in the resonant frequency fr or anti-resonant frequency fa can possibly be not detected. In this case as well, the impedance ratio (|Za/Zr|) of resonance decreases.

This does not demonstrate that, when the amount and condition of adherents on the protective cover 2 (the status of the protective cover 2) cannot be acquired merely based on the resonant frequency fr or the anti-resonant frequency fa, the amount and condition of adherents on the protective cover 2 can be acquired by detecting the impedance ratio (|Za/Zr|) of resonance. For example, it may be estimated that ice is adhered to the surface of the protective cover 2 when a decrease in the impedance ratio (|Za/Zr|) of resonance is large although a change in the resonant frequency fr is small. In other words, the monitor 30 is able to estimate the type of adherents and/or the status of adherents in more details in conformity with characteristics, such as detected values for adherents and changes in the values, by using a computed value that is a combination of a plurality of detected values.

The value to be detected by the monitor 30 is not limited to the electrical characteristic value of the self-excited circuit as described above, and may be various values, such as the environmental temperature of the image capturing apparatus, the temperature of the vibrator 12, physical amounts, such as displacements of the protective cover 2 and vibrator 12, and time changes in those values. For example, the rate of change in the detected value of the monitor 30 monitoring adherents is small although the operation to remove adherents is being executed, the controller 20 determines that the adhesion of adherents on the protective cover 2 is strong.

To detect necessary detected values to acquire the amount and condition of adherents, the monitor 30 may include a sensor, or the like, or may use a function provided by an integrated circuit that is a component inside of the controller 20, in addition to detecting the electrical characteristic values of the self-excited circuit.

In the cleaning device of the image capturing apparatuses according to the above-described preferred embodiments, the controller 20 compares the electrical characteristic value detected by the monitor 30 with the first threshold (for example, step S52), and, when the electrical characteristic value is greater than the first threshold (for example, NO in step S52), compares the electrical characteristic value detected by the monitor 30 with the second threshold (for example, step S53). Therefore, the controller 20, when the electrical characteristic value is less than or equal to the first threshold, does not need to uselessly compare the electrical characteristic value with the second threshold and reduce the process. Of course, the controller 20 may compare the electrical characteristic value with each of the first threshold and the second threshold in the same process.

In the cleaning devices of the image capturing apparatuses according to the above-described preferred embodiments, the case where the values of the thresholds that are determination criteria are prestored in the storage 40 is described. Alternatively, the values of the thresholds may be obtained by computation or may be selected from a table, or the like. For example, the controller 20 causes the vibrator 12 to perform an initial operation, detects the electrical characteristic value of the vibrator 12 at that time, and stores the detected value in the storage 40 as a reference value. This reference value is set for the first threshold as a value when there is no adherents on the protective cover 2. The controller 20 may compute the amount of change in a detected value in vibrating the protective cover 2 with respect to the reference value and compare the amount of change with the prestored second threshold. Here, it is assumed that the reference value means that there are no adherents on the protective cover 2. However, there is a measurement error in the monitor 30. Therefore, even when there are adherents, a small amount of raindrops does not interfere with the visual field of the image capturing device 5. Thus, the reference value may be a range in which it is determined that there are no adherents on the protective cover 2 to perform the function of the image capturing device 5. Therefore, the reference value ±α may be set for the first threshold.

In the image capturing apparatuses according to the above-described preferred embodiments, the configuration of the image capturing device 5 is not specifically described in detail. However, the image capturing device 5 may include a camera, LiDAR, Rader, and the like, for example.

In the cleaning devices of the image capturing apparatuses according to the above-described preferred embodiments, the amount and condition of adherents on the protective cover 2 is severe when the detected electrical characteristic value is large in FIG. 5, or the like. It is also conceivable that the amount and condition of adherents on the protective cover 2 is severe even when the detected electrical characteristic value is small. The relationship between the detected electrical characteristic value and the amount and condition of adherents on the protective cover 2 is not limited to a linear relationship and may be an inverse relationship. For this reason, the definition of the first threshold means the amount and condition of adherents on the protective cover 2 and does not limit the magnitude of a detected electrical characteristic value.

In the cleaning devices of the image capturing apparatuses according to the above-described preferred embodiments, the controller 20 vibrates the vibrator 12 to acquire the amount and condition of adherents on the protective cover 2. However, the controller 20 does not need to constantly vibrate the vibrator 12 and may intermittently vibrate the vibrator 12 at predetermined intervals. When adherents on the protective cover 2 are detected by another sensor, the controller 20 may vibrate the vibrator 12 to determine the amount and condition of adherents on the protective cover 2.

In the cleaning devices of the image capturing apparatuses according to the above-described preferred embodiments, the thresholds with which the electrical characteristic value detected by the monitor 30 is compared, and the duration of control are illustrated as determination criteria. However, the determination criteria are not limited thereto.

In the cleaning devices of the image capturing apparatuses according to the above-described preferred embodiments, cleaning by vibrating the protective cover 2, cleaning by discharging cleaning solution with the discharge device 50, and cleaning by discharging air with the discharge device 50 are illustrated. However, the configuration is not limited thereto. Alternatively, the cleaning device may vibrate the vibrator 12 only to determine the amount and condition of adherents on the protective cover 2 and may remove adherents on the protective cover 2 by a method other than cleaning by vibrating the protective cover 2. In addition, the cleaning device may variously select from among various choices having different cleaning performances according to the amount and condition of adherents on the protective cover 2. For example, the first cleaning substance and the second cleaning substance both may be air, and the cleaning device may remove adherents on the protective cover 2 by adjusting the volume of air.

In the image capturing apparatuses according to the above-described preferred embodiments, the configuration that the single cleaning nozzle 3 is provided on the casing 1 as shown in FIG. 1 is described. However, the configuration is not limited thereto. A plurality of the cleaning nozzles 3 may be provided on the casing 1.

The image capturing apparatuses according to the above-described preferred embodiments is not limited to an image capturing apparatus provided on a vehicle, and may be similarly applied to an image capturing apparatus including a translucent body that is disposed in a visual field of an imaging element and that is to be cleaned.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning device comprising:
   an imaging element;
   a holder to hold the imaging element;
   a translucent body disposed in a visual field of the imaging element;
   a vibrator to vibrate the translucent body;
   a controller to control the vibrator;
   a monitor to detect an electrical characteristic value associated with a vibration of the vibrator; and
   a storage to store determination criteria based on which the controller evaluates the electrical characteristic value detected by the monitor; wherein
   the controller is configured to evaluate the electrical characteristic value based on a plurality of the determination criteria stored in the storage and to clean a surface of the translucent body by controlling the vibrator according to the evaluation;
   the vibrator includes a first cylindrical member, a second cylindrical member, and a piezoelectric resonator;
   the first cylindrical member is fixed to the second cylindrical member, and a portion of the first cylindrical member and a portion of the second cylindrical member are in press-contact with a top surface and a bottom surface of the piezoelectric resonator; and
   at least a portion of at least one of the first and second cylindrical members is disposed between the translucent body and the piezoelectric resonator.

2. The cleaning device according to claim 1, wherein
   the plurality of determination criteria includes a first threshold with which the electrical characteristic value detected by the monitor is compared, and a second threshold different from the first threshold; and the controller is configured to:
  when the electrical characteristic value detected by the monitor is greater than the first threshold and less than or equal to the second threshold, control the vibrator to cause the translucent body to vibrate at a first level; and
  when the electrical characteristic value detected by the monitor is greater than the second threshold, control the vibrator to cause the translucent body to vibrate at a second level different from the first level.

3. The cleaning device according to claim 1, wherein the plurality of determination criteria includes a threshold with which the electrical characteristic value detected by the monitor is compared, and a duration of control; and
the controller is configured to:
  when the electrical characteristic value detected by the monitor is greater than the threshold, control the vibrator to cause the translucent body to vibrate at a first level; and
  after a lapse of the duration of control during which the vibrator causes the translucent body to vibrate at the first level, when the electrical characteristic value detected by the monitor exceeds the threshold, control the vibrator to cause the translucent body to vibrate at a second level different from the first level.

4. The cleaning device according to claim 2, further comprising:
a discharge device to discharge a cleaning substance to a surface of the translucent body; wherein
the controller is configured to, when the electrical characteristic value detected by the monitor is greater than the second threshold, cause the discharge device to discharge the cleaning substance.

5. The cleaning device according to claim 1, further comprising:
a discharge device to discharge a cleaning substance to a surface of the translucent body; wherein
the plurality of determination criteria includes a first threshold with which the electrical characteristic value detected by the monitor is compared, and a second threshold different from the first threshold; and
the controller is configured to:
  when the electrical characteristic value detected by the monitor is greater than the first threshold and less than or equal to the second threshold, control the vibrator to cause the translucent body to vibrate at a first level; and
  when the electrical characteristic value detected by the monitor is greater than the second threshold, cause the discharge device to discharge the cleaning substance.

6. The cleaning device according to claim 3, further comprising:
a discharge device to discharge a cleaning substance to a surface of the translucent body; wherein
the controller is further configured to, after the lapse of the duration of control during which the vibrator causes the translucent body to vibrate at the first level, when the electrical characteristic value detected by the monitor exceeds the threshold, further cause the discharge device to discharge the cleaning substance.

7. The cleaning device according to claim 1, further comprising:
a discharge device configured to discharge a cleaning substance to a surface of the translucent body; wherein
the plurality of determination criteria includes a threshold with which the electrical characteristic value detected by the monitor is compared, and a duration of control; and
the controller is configured to:
  when the electrical characteristic value detected by the monitor is greater than the threshold, control the vibrator to cause the translucent body to vibrate at a first level; and
  after a lapse of the duration of control during which the vibrator causes the translucent body to vibrate at the first level, when the electrical characteristic value detected by the monitor exceeds the threshold, cause the discharge device to discharge the cleaning substance.

8. The cleaning device according to claim 1, wherein
the plurality of determination criteria includes a threshold with which the electrical characteristic value detected by the monitor is compared, and a duration of control, the cleaning device further comprising:
a discharge device to discharge a cleaning substance to a surface of the translucent body; wherein
the controller is configured to:
  when the electrical characteristic value detected by the monitor is greater than the threshold, cause the discharge device to discharge the cleaning substance and cause the translucent body to vibrate at a first level; and
  after a lapse of the duration of control during which the vibrator causes the translucent body to vibrate at the first level, when the electrical characteristic value detected by the monitor exceeds the threshold, stop discharge of the cleaning substance from the discharge device and control the vibrator to cause the translucent body to vibrate at a second level different from the first level.

9. The cleaning device according to claim 1, wherein
the plurality of determination criteria includes a threshold with which the electrical characteristic value detected by the monitor is compared, and a duration of control, the cleaning device further comprising:
a discharge device to discharge a cleaning substance to a surface of the translucent body; wherein
the controller is configured to:
  when the electrical characteristic value detected by the monitor is greater than the threshold, cause the discharge device to discharge the cleaning substance; and
  after a lapse of the duration of control during which the discharge device discharges the cleaning substance, when the electrical characteristic value detected by the monitor exceeds the threshold, stop causing the discharge device to discharge the cleaning substance and control the vibrator to cause the translucent body to vibrate.

10. The cleaning device according to claim 4, wherein the cleaning substance includes a first cleaning substance and a second cleaning substance having a higher cleaning performance than the first cleaning substance, and the discharge device discharges the first cleaning substance to clean the surface of the translucent body and the second cleaning substance.

11. The cleaning device according to claim 1, wherein the monitor is configured to detect at least one of a resonant frequency, an anti-resonant frequency, a band width of resonance, a resonant impedance, an anti-resonant impedance, an impedance ratio of resonance, and a current value of a driver circuit, or to compute a computed value that is a combination of at least two of the resonant frequency, the anti-resonant frequency, the band width of resonance, the resonant impedance, the anti-resonant impedance, the impedance ratio of resonance, and the current value of the driver circuit as the electrical characteristic value.

12. The cleaning device according to claim 2, wherein
the controller is configured to, when the electrical characteristic value detected by the monitor is compared with the first threshold and the electrical characteristic value is greater than the first threshold, compare the electrical characteristic value detected by the monitor with the second threshold.

13. The cleaning device according to claim 1, further comprising:
a discharge device to discharge a cleaning substance to a surface of the translucent body; wherein
the plurality of determination criteria include a first threshold with which the electrical characteristic value detected by the monitor is compared, a second threshold different from the first threshold, and a third threshold different from the first and second thresholds; and
the controller is configured to:
when the electrical characteristic value detected by the monitor is greater than the first threshold and less than or equal to the second threshold, control the vibrator to cause the translucent body to vibrate at a first level;
when the electrical characteristic value detected by the monitor is greater than the second threshold and less than or equal to the third threshold, control the vibrator to cause the translucent body to vibrate at a second level different from the first level; and
when the electrical characteristic value detected by the monitor is greater than the third threshold, control the vibrator to cause the translucent body to vibrate at one of the first and second levels and to cause the discharge device to discharge the cleaning substance.

14. The cleaning device according to claim 1, further comprising:
a discharge device to discharge a cleaning substance to a surface of the translucent body; wherein
the plurality of determination criteria include a first threshold with which the electrical characteristic value detected by the monitor is compared, a second threshold different from the first threshold, and an amount of the cleaning substance in the discharge device; and
the controller is configured to:
when the electrical characteristic value detected by the monitor is greater than the first threshold and less than or equal to the second threshold, control the vibrator to cause the translucent body to vibrate at a first level;
when the electrical characteristic value detected by the monitor is greater than the second threshold and the amount of the cleaning substance in the discharge device is less than a set amount, control the vibrator to cause the translucent body to vibrate at a second level different from the first level; and
when the electrical characteristic value detected by the monitor is greater than the second threshold and the amount of the cleaning substance in the discharge device is greater than the set amount, control the vibrator to cause the translucent body to vibrate at one of the first and second levels and to cause the discharge device to discharge the cleaning substance.

15. An image capturing apparatus comprising:
the cleaning device according to claim 1; and
an imaging device that includes the imaging element.

* * * * *